(12) United States Patent
Bae et al.

(10) Patent No.: US 10,892,924 B2
(45) Date of Patent: Jan. 12, 2021

(54) MODULATION AND DEMODULATION METHOD IN LAYER-DIVISION MULTIPLEXING SYSTEM, AND RECEIVER THEREOF

(71) Applicant: Electronics and Telecommunications Research Institute, Daejeon (KR)

(72) Inventors: Jae-Hwui Bae, Daejeon (KR); Sun-Hyoung Kwon, Daejeon (KR); Young-Su Kim, Sejong-si (KR); Dong-Joon Choi, Daejeon (KR); Nam-Ho Hur, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/797,845

(22) Filed: Feb. 21, 2020

(65) Prior Publication Data
US 2020/0396110 A1    Dec. 17, 2020

(30) Foreign Application Priority Data

Jun. 17, 2019 (KR) .................. 10-2019-0071286

(51) Int. Cl.
*H04W 72/04* (2009.01)
*H04L 27/00* (2006.01)
*H04J 99/00* (2009.01)

(52) U.S. Cl.
CPC ......... *H04L 27/0008* (2013.01); *H04J 15/00* (2013.01); *H04W 72/042* (2013.01)

(58) Field of Classification Search
CPC ........... H04W 72/042; H04W 72/0446; H04W 74/0833; H04W 72/0453; H04W 16/28;
(Continued)

(56) References Cited

U.S. PATENT DOCUMENTS 10,003,486 B2    6/2018    Zhu et al.
10,404,351 B2    9/2019    Seo et al.
(Continued)

FOREIGN PATENT DOCUMENTS

JP         2018050153 A    3/2018
KR    1020170037405 A    4/2017
(Continued)

OTHER PUBLICATIONS

Kim et al; Analysis of Channel Capacity for Three-layer Signals in Layered Division Multiplexing System; IEEE 2019 (Year: 2019).*

*Primary Examiner* — Eva Y Puente
(74) *Attorney, Agent, or Firm* — William Park & Associates Ltd.

(57) ABSTRACT

Disclosed herein is a demodulation method of a Layer-Division Multiplexing (LDM) system. The demodulation method may include receiving an LDM modulation signal, restoring a first-layer signal from the LDM modulation signal and remodulating the first-layer signal, restoring and remodulating a second-layer signal by performing cancellation of the amplitude component of the first-layer signal from the LDM modulation signal using signaling information independently of restoration and remodulation of the first-layer signal, and restoring a third-layer signal using the first-layer signal, the second-layer signal, and the LDM modulation signal.

18 Claims, 15 Drawing Sheets

(58) Field of Classification Search
CPC . H04W 72/0413; H04W 24/10; H04W 48/16; H04W 72/046; H04W 72/1268; H04L 1/0071; H04L 1/0041; H04L 1/0057; H04L 1/0045; H04L 1/0058; H04L 2001/0093; H04L 27/2613; H04L 27/3488; H04L 1/0065; H04L 1/007; H04L 5/0007; H03M 13/152; H03M 13/255; H03M 13/2778; H03M 13/1165; H03M 13/271; H03M 13/2732; H03M 13/2906; H03M 13/253; H03M 13/2707; H03M 13/2792; H03M 13/1102
USPC .......................................................... 375/295
See application file for complete search history.

(56) References Cited

U.S. PATENT DOCUMENTS

| | | | |
|---|---|---|---|
| 2003/0002590 A1* | 1/2003 | Kaku | H04B 1/123 375/285 |
| 2007/0223608 A1* | 9/2007 | Nakayama | H04L 27/2601 375/260 |
| 2017/0279648 A1* | 9/2017 | Song | H04L 27/2618 |
| 2018/0302258 A1 | 10/2018 | Park et al. | |
| 2019/0199460 A1* | 6/2019 | Simon | H04B 7/0413 |
| 2019/0327445 A1* | 10/2019 | Lee | H04H 20/72 |

FOREIGN PATENT DOCUMENTS

| | | |
|---|---|---|
| KR | 1020170126174 A | 11/2017 |
| KR | 1020180042789 A | 4/2018 |
| KR | 1020180072406 A | 6/2018 |
| KR | 101943174 B1 | 1/2019 |

* cited by examiner

MODULATION AND DEMODULATION METHOD IN LAYER-DIVISION MULTIPLEXING SYSTEM, AND RECEIVER THEREOF

CROSS REFERENCE TO RELATED APPLICATION

This application claims the benefit of Korean Patent Application No. 10-2019-0071286, filed Jun. 17, 2019, which is hereby incorporated by reference in its entirety into this application.

BACKGROUND OF THE INVENTION

1. Technical Field

The present invention relates to modulation and demodulation methods in a Layer-Division Multiplexing (LDM) system to which three-layer LDM modulation is applied and a receiver thereof.

2. Description of the Related Art

Generally, an Advanced Television Systems Committee (ATSC) 3.0 broadcast system adopts two-layer LDM modulation technology. Here, the LDM modulation technology is a kind of multiplexing technology for transmitting multiple broadcast streams over a single RF channel, and was first applied to an ATSC 3.0 physical layer. Unlike Time-Division Multiplexing (TDM) or Frequency-Division Multiplexing (FDM), which divide time or frequency resources so as to be used for respective broadcast streams, LDM modulation technology is configured to divide only the power of a transmitted signal.

Two-layer LDM modulation technology included in ATSC 3.0 is configured with a Core Layer (CL) and an Enhanced Layer (EL). The two-layer LDM modulation technology included in ATSC 3.0 is configured such that multiple Physical Layer Pipes (PLPs) having different transmission power levels, modulation schemes, and channel-coding rates are transmitted using a single Radio Frequency (RF) bandwidth. For example, for 2-PLP transmission, the core layer (CL) applies Quadrature Phase-Shift Keying (QPSK), a channel-coding rate (CR) of 4/15, and Low-Density Parity Check (LDPC) code, the code length of which is defined as $N_{inner}$=64800, and the enhanced layer (EL) applies 64-QAM, a channel-coding rate of CR=10/15, and LDPC code, the code length of which is defined as $N_{inner}$=64800. When a two-layer LDM modulation signal is received, the CL signal can be demodulated directly from the received two-layer LDM modulation signal, and the EL signal may be received after the CL signal is removed. Accordingly, in order to receive the EL signal, it is required to remove the CL signal component from the received two-layer LDM modulation signal by demodulating and remodulating the upper-layer CL signal.

Documents of Related Art (Patent Document 1) Japanese Patent Application Publication No. JP2018-050153, published on Mar. 29, 2018 and titled "OFDM signal transmitter, OFDM signal receiver, OFDM signal transmission method. OFDM signal reception method, and chip" (Patent Document 2) Korean Patent Application Publication No. 10-2017-0037405, published on Apr. 4, 2017 and titled "Transmitting apparatus, receiving apparatus, and control method thereof".

SUMMARY OF THE INVENTION

An object of the present invention is to provide modulation and demodulation methods of a Layer-Division Multiplexing (LDM) system and a receiver thereof in order to reduce hardware complexity and restoration time.

The technical objects of the present invention are not limited to the above technical object, and other technical objects that are not mentioned will be readily understood by a person of ordinary skill in the art from the following description.

A demodulation method of a Layer-Division Multiplexing (LDM) system according to an embodiment of the present invention may include receiving an LDM modulation signal; restoring a first-layer signal from the LDM modulation signal and remodulating the first-layer signal; restoring and remodulating a second-layer signal by performing cancellation of an amplitude component of the first-layer signal from the LDM modulation signal using signaling information, independently of restoration and remodulation of the first-layer signal; and restoring a third-layer signal using the first-layer signal, the second-layer signal, and the LDM modulation signal.

In an embodiment, restoring and remodulating the first-layer signal may be performed in parallel with restoring and remodulating the second-layer signal.

In an embodiment, the cancellation may be performed regardless of the result of restoration of the first-layer signal, and restoration and remodulation of the second-layer signal may correspond to Amplitude-Shift Keying (ASK).

In an embodiment, the signaling information may include a first injection level that is used when the second-layer signal is modulated and a second injection level that is used when the third-layer signal is modulated.

In an embodiment, remodulating the second-layer signal may include restoring the second-layer signal from a modulated second-layer signal corresponding to the result of the cancellation using the second injection level.

In an embodiment, the demodulation method may further include storing the received LDM modulation signal.

In an embodiment, restoring the third-layer signal may include removing a first LDM modulation signal from the LDM modulation signal, the first LDM modulation signal may be a signal acquired by combining a modulated first-layer signal with a modulated second-layer signal, the power level of which is changed based on a first injection level, and the modulated first-layer signal may be a signal acquired by modulating the first-layer signal using a first modulation method.

In an embodiment, restoring the third-layer signal may include restoring the third-layer signal from a signal from which the first LDM modulation signal is removed using the second injection level, and the LDM modulation signal may be a signal acquired by combining the first LDM modulation signal with a modulated third-layer signal, the power level of which is changed based on the second injection level.

A receiver of a Layer-Division Multiplexing (LDM) system according to an embodiment of the present invention may include a first-layer signal restoration and remodulation module for restoring a first-layer signal from an LDM modulation signal and remodulating the first-layer signal; a second-layer signal restoration and remodulation module for restoring and remodulating a second-layer signal by performing cancellation of the amplitude component of the first-layer signal from the LDM modulation signal using signaling information independently of restoration and remodulation of the first-layer signal; a third-layer restoration module for restoring a third-layer signal using the first-layer signal, the second-layer signal, and the LDM modulation signal; and LDM signal storage for storing the LDM modulation signal. The first-layer signal restoration and remodulation module may be operated in parallel with the second-layer signal restoration and remodulation module.

In an embodiment, in the LDM modulation signal, the power of each of a modulated first-layer signal, a modulated second-layer signal, and a modulated third-layer signal may be normalized to 1.

In an embodiment, the second-layer signal restoration and remodulation module may perform cancellation of the amplitude component of the first-layer signal from the normalized LDM modulation signal.

In an embodiment, the amplitude of the first-layer signal may be determined depending on a first injection level and a second injection level, the first injection level may be a value that is used in order to change the power level of the modulated second-layer signal when the LDM modulation signal is generated, and the second injection level may be a value that is used in order to change the power level of the modulated third-layer signal when the LDM modulation signal is generated.

In an embodiment, the third-layer restoration module may synchronize the starts of the LDM modulation signal, the first-layer signal, and the second-layer signal.

In an embodiment, the first-layer signal restoration and remodulation module may output the first-layer signal by demodulating a Quadrature Phase-Shift Keying (QPSK)-modulated signal, the second-layer signal restoration and remodulation module may output the second-layer signal by demodulating an Amplitude-Shift Keying (ASK)-modulated signal; and the third-layer restoration module may output the third-layer signal by demodulating a Quadrature Amplitude Modulation (QAM)-modulated signal.

A modulation method of a Layer-Division Multiplexing (LDM) system according to an embodiment of the present invention may include modulating a first-layer signal using a first modulation method; modulating a second-layer signal using a second modulation method; converting the modulated second-layer signal using a first injection level; modulating a third-layer signal using a third modulation method; converting the modulated third-layer signal using a second injection level; and generating an LDM modulation signal by combining the modulated first-layer signal, the converted modulated second-layer signal, and the converted modulated third-layer signal. The first injection level and the second injection level may be transmitted to a receiver as signaling information.

In an embodiment, the first modulation method may be a Quadrature Phase-Shift Keying (QPSK) modulation method, the second modulation method may be an Amplitude-Shift Keying (ASK) modulation method, and the third modulation method may be a Quadrature Amplitude Modulation (QAM) method.

In an embodiment, the LDM modulation signal may be generated using a two-layer multiplexing method.

In an embodiment, generating the LDM modulation signal may include generating a first LDM modulation signal by combining the modulated first-layer signal with the converted modulated second-layer signal and generating a second LDM modulation signal by combining the first LDM modulation signal with the converted modulated third-layer signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
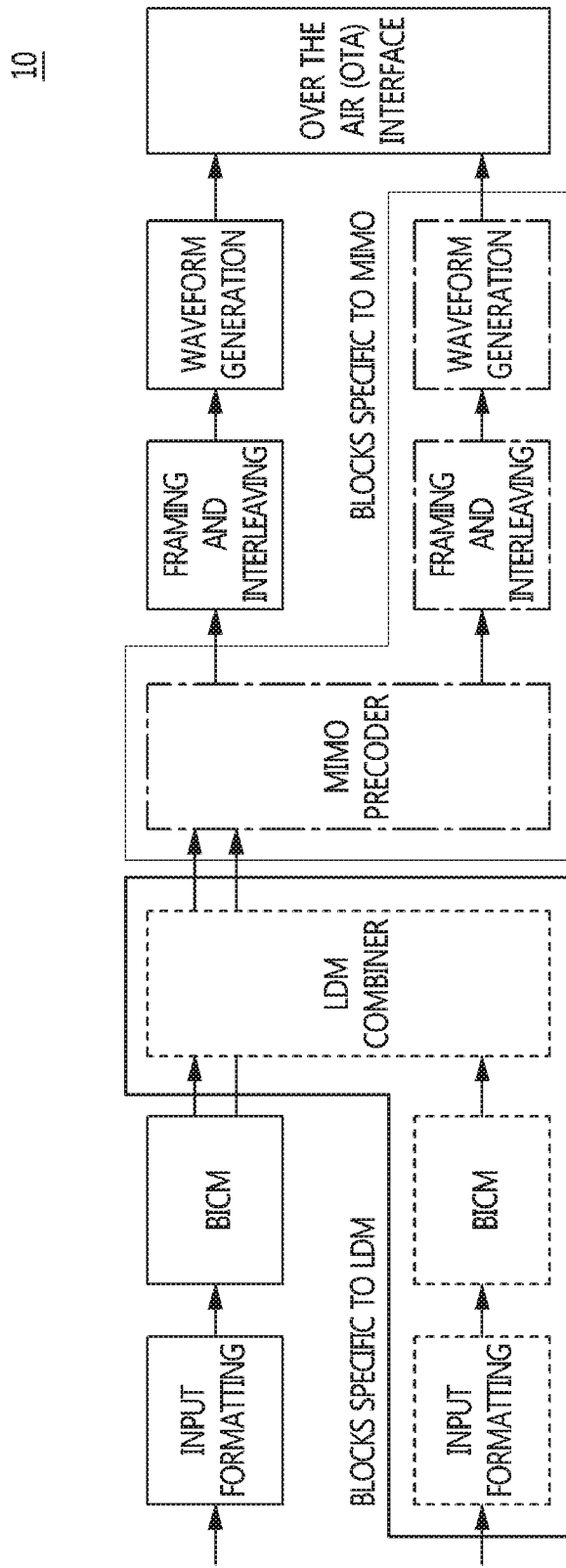
FIG. 1 is a block diagram illustrating a general ATSC 3.0 transmission system.

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that the embodiments are not intended to limit the present invention to specific disclosure forms and that they include all changes, equivalents or modifications included in the spirit and scope of the present invention. It will be understood that, although the terms "first," "second," etc. may be used herein to describe various elements, these elements are not intended to be limited by these terms. These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Also, the terms used herein are used merely to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Modulation and demodulation methods in a Layer-Division Multiplexing (LDM) system according to an embodiment of the present invention enable a modulated signal to be generated and demodulated using new three-layer LDM modulation. The three-layer LDM system according to an embodiment of the present invention enables a newly added middle-layer signal to be received without remodulation of a QPSK-modulated signal of an upper layer in the process of receiving a three-layer LDM modulation signal. If demodulation and remodulation of the upper-layer signal are required in order to receive the newly added middle-layer signal in general three-layer LDM modulation, the complexity of a receiver increases compared to the two-layer LDM modulation. However, the LDM system according to an embodiment of the present invention does not require demodulation or remodulation of the upper-layer signal in the process of receiving the three-layer LDM modulation signal.

Because the three-layer LDM system according to an embodiment of the present invention does not require demodulation or remodulation of an upper-layer signal in the process of receiving a three-layer LDM modulation signal, it is advantageous from the aspects of reduction of the complexity of a receiver and reduction of the amount of power consumed by the receiver, and applicability to a mobile broadcasting receiver, which uses a limited amount of power, may be significantly improved.

FIG. 1 is a block diagram illustrating a general ATSC 3.0 transmission system. Referring to FIG. 1, the ATSC 3.0 transmission system 10 includes an input-formatting block for configuring an input data format, a Bit-Interleaved Coded Modulation (BICM) block for applying a forward error correction scheme and mapping data depending on a signal constellation, a framing and interleaving block for performing time and frequency interleaving and generating a transmission frame, and a waveform generation block for determining an output waveform. In FIG. 1, the blocks marked with dotted lines indicate LDM-combined blocks, the blocks marked with chain lines indicate MIMO precoder blocks, and the blocks marked with solid lines indicate blocks used for both LDM modulation and MIMO.

Input data is formatted in the input-formatting block and delivered to the BICM block. In the BICM block, the data is coded using Forward Error Correction (FEC) and the process of mapping the data to constellation signals is performed. The framing and interleaving block performs interleaving in time and frequency domains. The waveform generation block finally generates a waveform for transmission.

Figure 2:
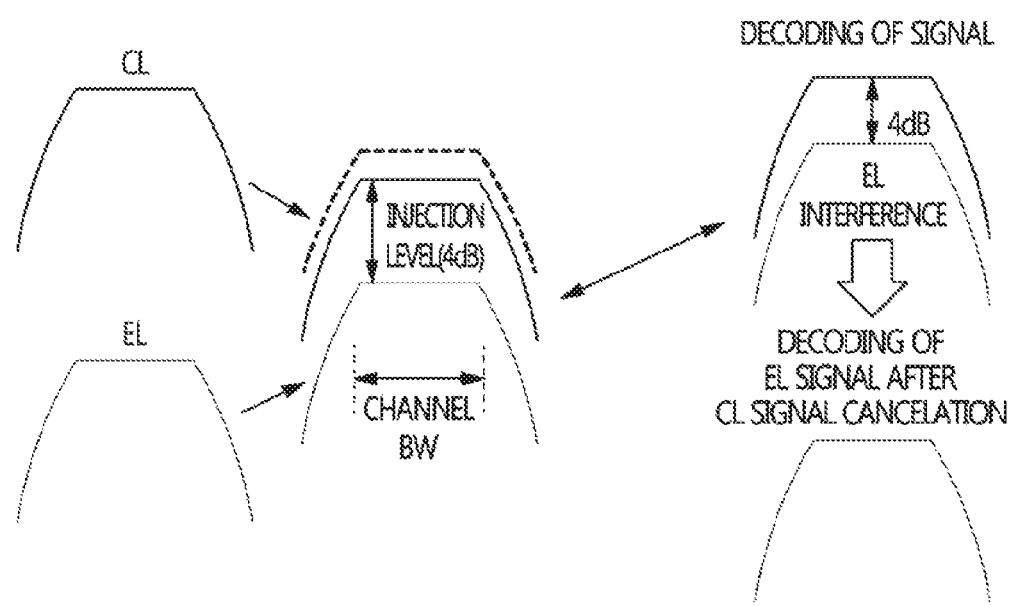
FIG. 2 is a view illustrating a core layer (CL) and an enhanced layer (EL) in two-layer LDM modulation.

FIG. 2 is a view illustrating a core layer (CL) and an enhanced layer (EL) in two-layer LDM modulation. Referring to FIG. 2, the two-layer LDM system transmits a signal by combining two or more physical layer pipes (PLPs). In the two-layer LDM modulation signal, a signal having a high power level is represented as a core layer CL, and a signal having a relatively low power level is represented as an enhanced layer EL.

The core layer CL uses a modulation scheme and an error correction scheme that are the same as or more robust than those used in the enhanced layer EL. Generally, when two-layer LDM modulation is applied, the channel code length may be the same, but different coding rates and different modulation constellations may be applied. For example, the core layer CL uses a channel code length of 64800, Low-Density Parity Check (LDPC) channel code having a code rate of 4/15, and PSK modulation. The enhanced layer EL may use a channel code length of 64800, LDPC channel code having a code rate of 10/15, and 64-QAM.

Generally, the two-layer LDM system performs decoding of the enhanced layer EL after decoding of the core layer CL. This is because it is necessary to remove the signal of the core layer CL from the interference signal of the enhanced layer EL before decoding of the enhanced layer EL is performed.

Figure 3:
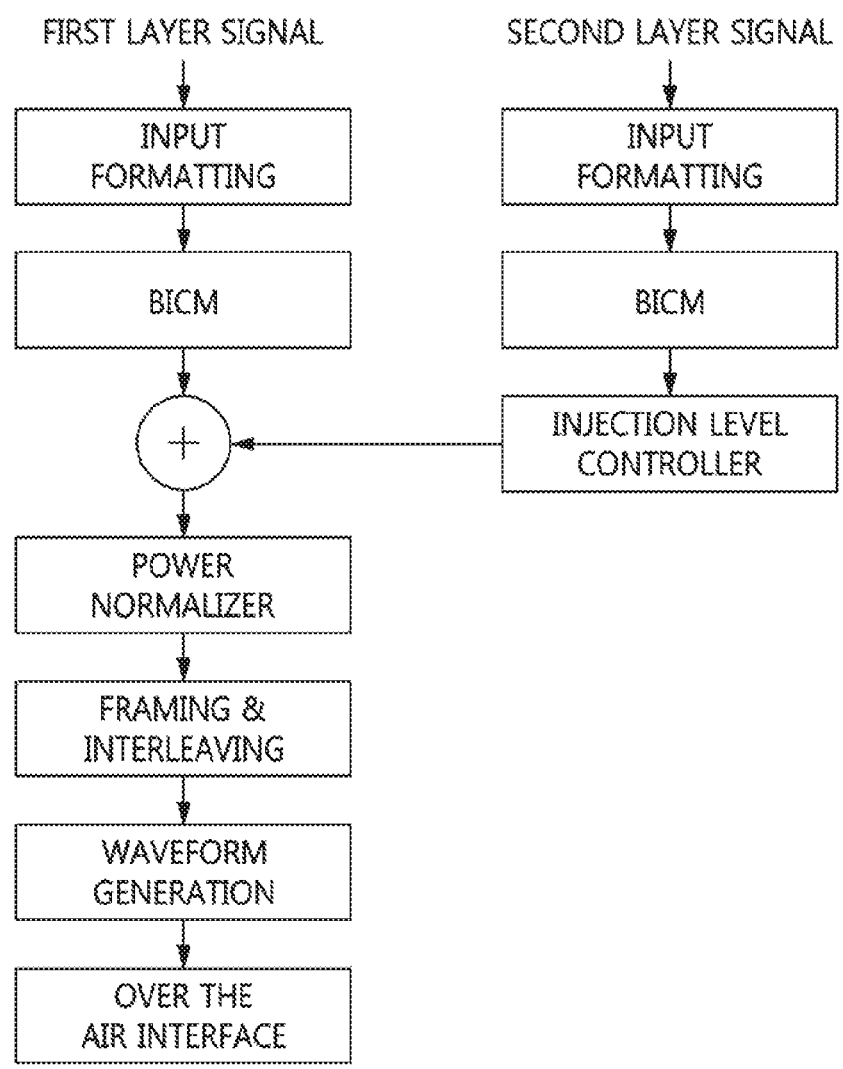
FIG. 3 is a view illustrating a modulation operation in a general two-layer LDM system.

FIG. 3 is a view illustrating a modulation operation in a general two-layer LDM system. Referring to FIG. 3, a second-layer signal, which is the enhanced layer EL, is converted in an injection-level controller such that the power of the enhanced layer EL is set 0-25 dB lower than a first-layer signal, which is the core layer CL. Then, the converted second-layer signal is combined with the signal of the core layer CL. The two-layer LDM modulation signal is input to a power normalizer block, and the power of the signal output therefrom is normalized to "1" and is then transmitted.

Figure 4:
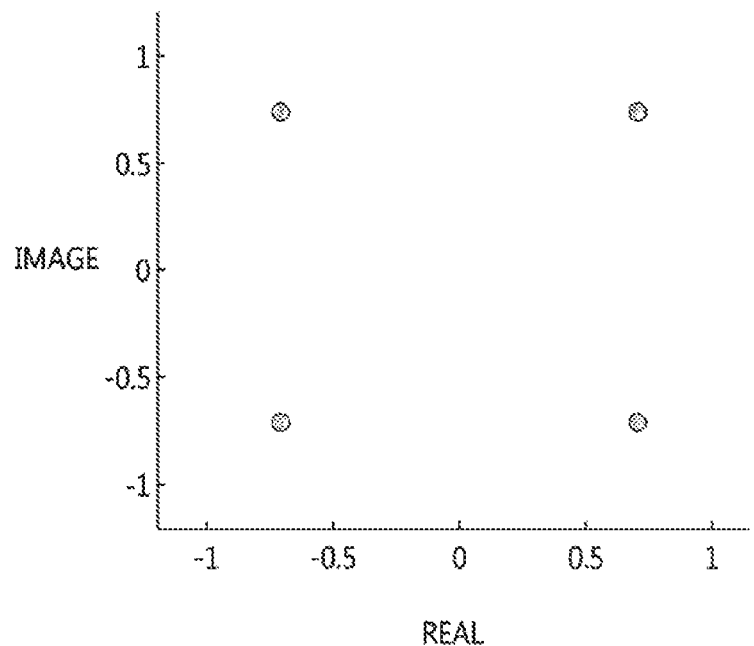
FIG. 4 is a view illustrating signal constellations when a QPSK modulation scheme is applied to a core layer (CL)
Figure 5:
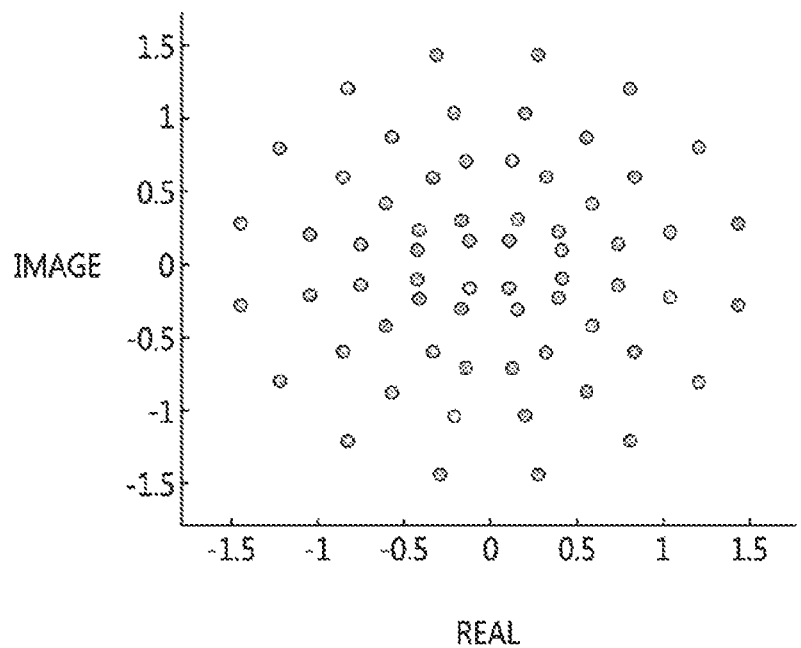
FIG. 5 is a view illustrating signal constellations when a non-uniform constellation 64-QAM scheme is applied to an enhanced layer (EL)
Figure 6:
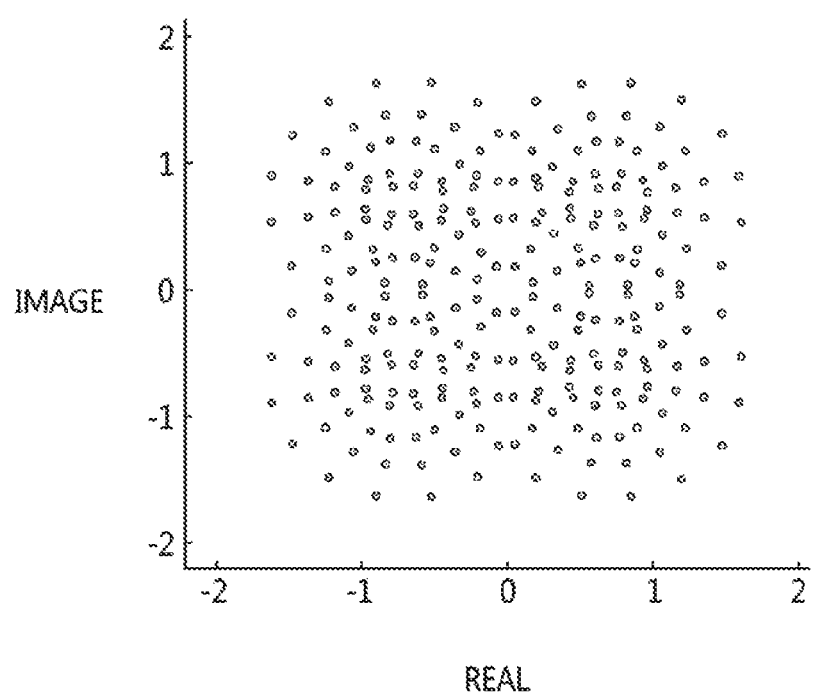
FIG. 6 is a view illustrating the constellations of a two-layer LDM modulation signal in which a QPSK-modulated signal of a core layer (CL) and an NUC 64-QAM signal of an enhanced layer (EL) are combined.

FIG. 4 is a view illustrating signal constellations when a QPSK modulation scheme is applied to a core layer CL. FIG. 5 is a view illustrating signal constellations when a Non-Uniform Constellation 64-QAM scheme is applied to an enhanced layer EL. FIG. 6 is a view illustrating the constellations of a two-layer LDM modulation signal in which a QPSK signal of a core layer CL is combined with an NUC 64-QAM signal of an enhanced layer EL.

Referring to FIGS. 4 to 6, an enhanced layer EL is injected with signal power that is 4 dB lower than that of a core layer CL, in which case a setting value for adjusting a power level is 0.6309573 and a normalization value for adjusting the power of the final output signal is 0.845762. In order to demodulate the LDM modulation signal, a receiver first demodulates the signal of the core layer CL, which is the most robust signal, removes the demodulated signal from the received signal, and demodulates the signal of the enhanced layer EL.

The general two-layer LDM system may acquire Quasi-Error-Free (QEF) Signal-to-Noise Ratio (SNR) gain that is 3-6 dB higher than that in the existing TDM system.

Meanwhile, a general three-layer LDM system performs three-layer modulation by adding a new signal to the existing two-layer LDM modulation. In two-layer LDM modulation, the core layer CL has a low QEF SNR and is mainly applied to mobile broadcasting. The enhanced layer EL has a relatively high QEF SNR compared to the core layer and is applied to an Ultra-High-Definition (UHD) broadcast service in a fixed reception condition. With regard to the newly added middle-layer signal, a new three-layer signal is applied in the state in which the transmission rate and the QEF SNR of the enhanced layer EL, which is applied to the fixed UHDTV reception, are maintained at the same level as in the existing two-layer LDM modulation and in which a little loss in the QEF SNR of the core layer CL is allowed. Accordingly, the newly added middle-layer signal may have a transmission rate that is similar to that of the core layer CL. As the result, the middle-layer signal is expected to be more applicable in mobile and portable reception conditions than in fixed reception conditions. Also, because the newly added middle-layer signal provides service for mobile terminals, which use a limited amount of power, a receiver is required to consume less power, so it is necessary to lower the hardware complexity thereof.

Meanwhile, in three-layer LDM modulation, an LL layer corresponds to an enhanced layer EL in the existing two-layer LDM modulation and is applied to a fixed UHDTV broadcast service. Accordingly, in order to receive the LL layer, it is necessary to remove UL and ML signals, which are upper layers, from the received three-layer LDM modulation signal.

Figure 7:
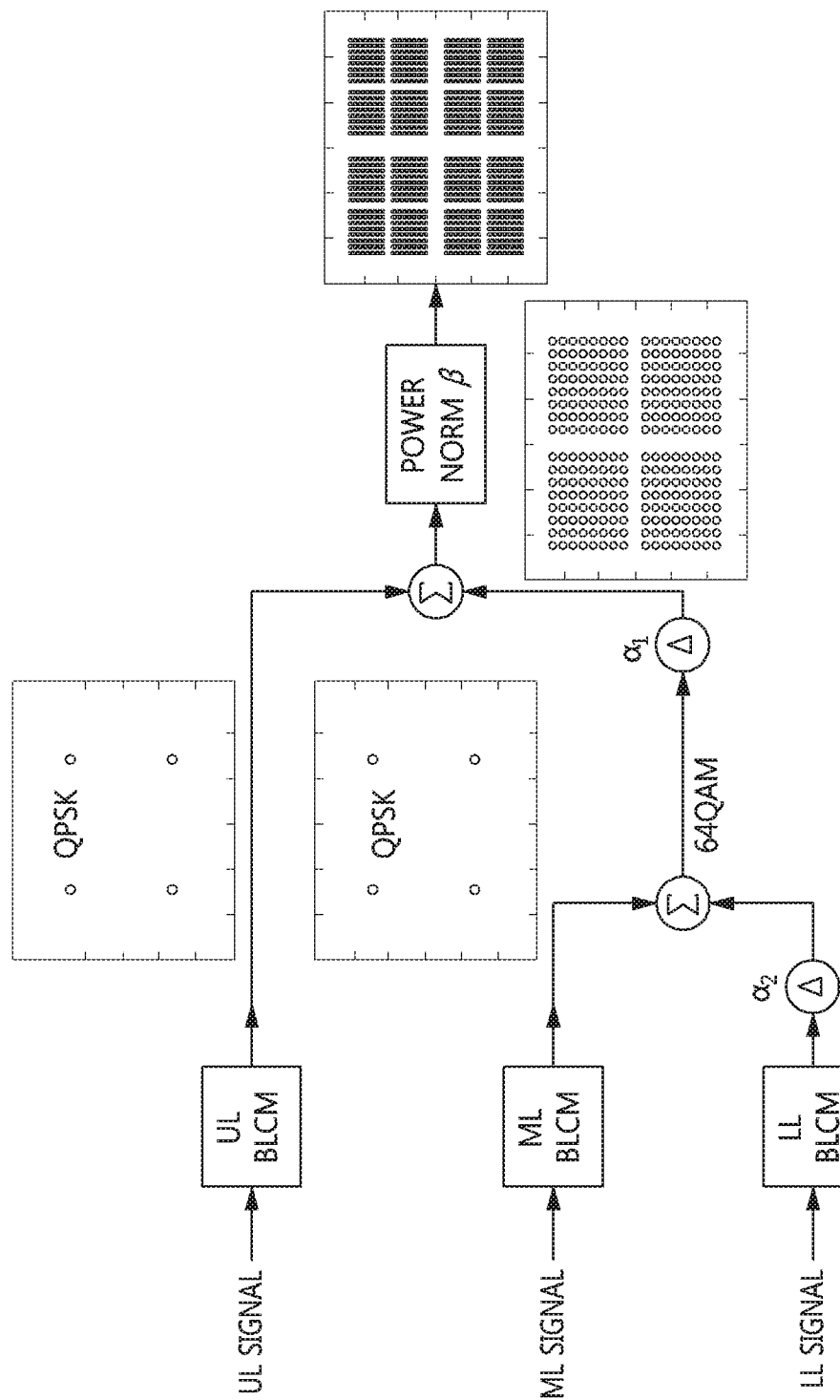
FIG. 7 is a view illustrating a general three-layer LDM system based on QPSK modulation and constellations when three-layer LDM modulation is performed.

FIG. 7 is a view illustrating a general three-layer LDM system based on QPSK modulation and constellations of three-layer LDM modulation. Referring to FIG. 7, a three-layer LDM modulation process in which QPSK modulation is applied to a newly added middle-layer signal is performed as follows. In three-layer LDM modulation, the layer having the highest priority is defined as an upper layer UL, the layer having the second-highest priority is defined as a middle layer ML, and the layer having the lowest priority is defined as a lower layer LL.

Because the upper layer UL corresponds to a core layer CL in the existing two-layer LDM modulation and because it is applied to mobile reception of a TV broadcast service, the complexity of the receiver of the upper layer UL and the amount of power consumed thereby must be low enough to be applicable to a mobile terminal, which uses a limited amount of power. In the case of two-layer LDM modulation, the core layer CL may be immediately received even though a noise level is raised due to the signal of the enhanced layer EL in the received two-layer LDM modulation signal. Similarly, in the case of three-layer LDM modulation, the QPSK-modulated UL signal may be immediately received even though the signals of the other two layers are present in the three-layer LDM modulation signal.

The middle layer ML is a newly added signal in three-layer LDM modulation. Because the three-layer LDM modulation is required to provide mobile and portable broadcasting as well as fixed UHDTV broadcasting, the transmission rate and QEF SNR of the signal of the enhanced layer EL, which provides fixed UHDTV broadcasting in two-layer LDM modulation, must be maintained. Therefore, the newly added middle-layer ML signal may entail a certain level of loss in the QEF SNR of the upper layer UL when it is added.

Figure 8:
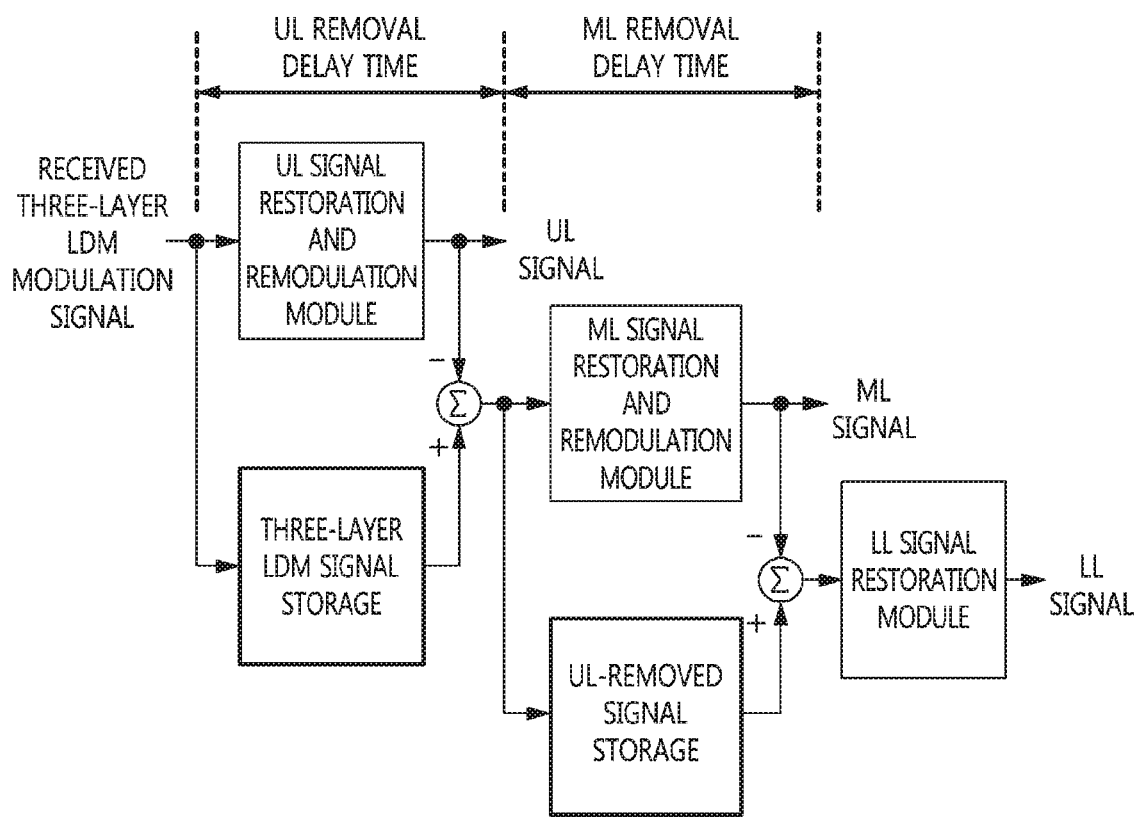
FIG. 8 is a view illustrating the process of receiving a three-layer LDM modulation signal in which QPSK modulation is applied to a middle layer (ML)

FIG. 8 is a view illustrating the process of receiving a three-layer LDM modulation signal in which QPSK modulation is applied to a middle layer ML. Referring to FIG. 8, in order to receive an ML signal, it is necessary to remove a UL signal, which is the upper layer, from the received three-layer LDM modulation signal. When QPSK modulation is applied to the middle layer ML, it is necessary to restore the phase information of the QPSK signal in order to receive the ML signal. Therefore, the upper-layer UL signal is demodulated and remodulated, whereby the UL signal component is removed from the received three-layer LDM modulation signal. In the case of three-layer LDM modulation based on QPSK, the ML signal is restored after the UL signal is restored.

The process of restoring the ML signal may cause problems of increasing hardware complexity and the amount of power consumed by a receiver because a signal-processing computation load is increased due to demodulation and remodulation of the UL signal. Therefore, when a QAM-based modulation scheme, in which information is carried in the phase of the signal, such as QPSK modulation, is applied to the middle layer ML, power consumption increases in the process of removing the upper-layer signal in order to restore phase information. Accordingly, it is difficult to apply to a mobile terminal that uses a limited amount of power.

Figure 9:
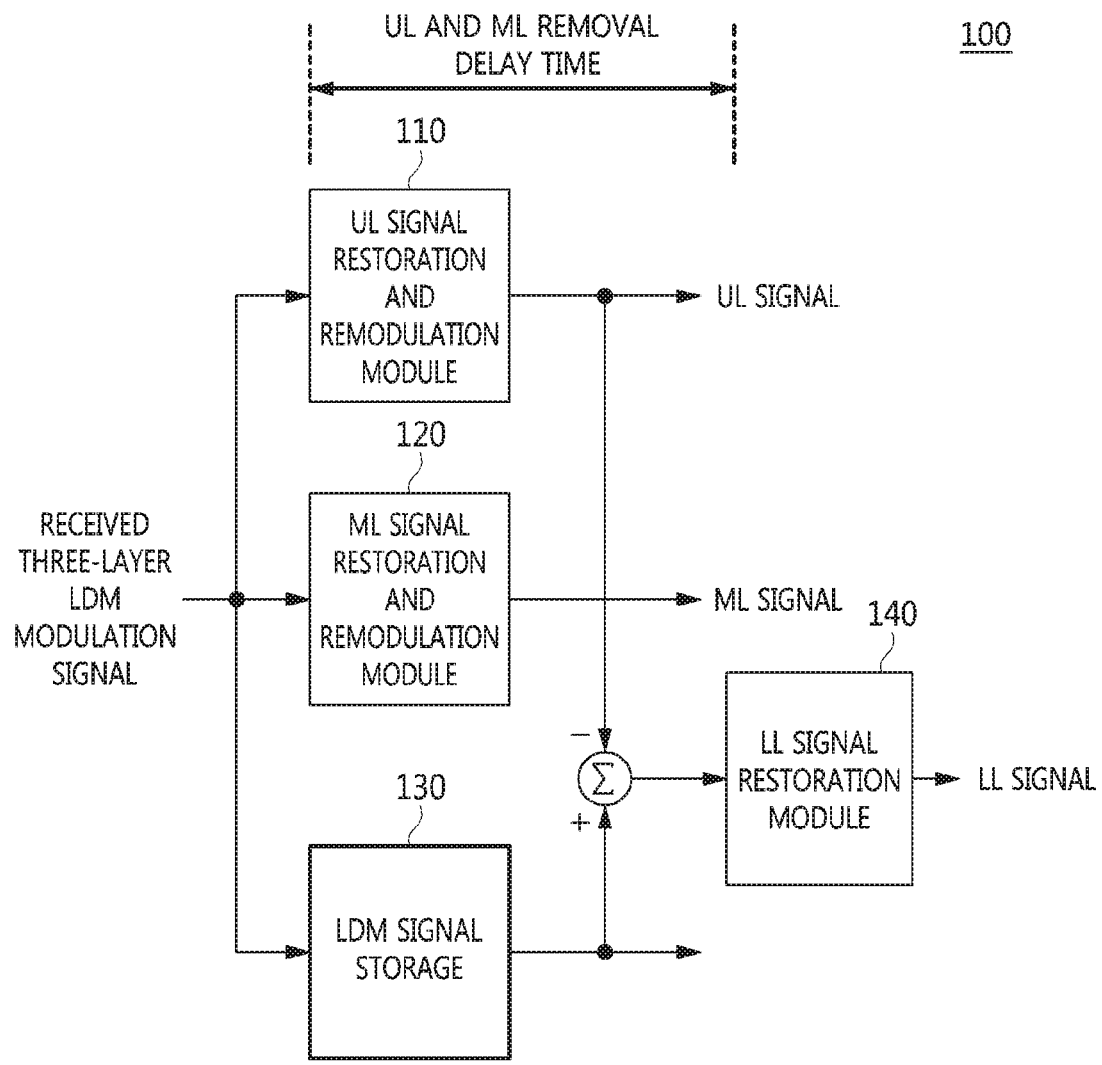
FIG. 9 is a view illustrating a receiver of a three-layer LDM system according to an embodiment of the present invention.

FIG. 9 is a view illustrating a receiver 100 of a three-layer LDM system according to an embodiment of the present invention. Referring to FIG. 9, the receiver 100 may include a first-layer signal restoration and remodulation module 110, a second-layer signal restoration and remodulation module 120, LDM modulation signal storage 130, and a third-layer signal restoration module 140.

The first-layer signal restoration and remodulation module 110 may be implemented so as to restore a first-layer UL signal from a Layer-Division Multiplexing (LDM) modulation signal and remodulate the same.

The second-layer signal restoration and remodulation module 120 may be implemented so as to perform cancellation of the amplitude component of the first-layer signal from the LDM modulation signal using signaling information, independently of restoration and remodulation of the first-layer UL signal, thereby restoring and remodulating a second-layer ML signal.

The LDM modulation signal storage 130 may be implemented so as to store the LDM modulation signal.

The third-layer signal restoration module 140 may be implemented so as to restore a third-layer LL signal using the first-layer UL signal, the second-layer ML signal, and the LDM modulation signal.

The first-layer signal restoration and remodulation module 110 and the second-layer signal restoration and remodulation module 120 may perform operations in parallel.

In an embodiment, the power of each of a modulated first-layer signal, a modulated second-layer signal, and a modulated third-layer signal in the LDM modulation signal may be normalized to 1.

In an embodiment, the second-layer signal restoration and remodulation module 120 may acquire the modulated second-layer signal by performing cancellation of the amplitude component of the first-layer signal from the normalized LDM modulation signal, and may restore the second-layer signal from the modulated second-layer signal.

Meanwhile, the process of receiving the three-layer LDM modulation signal to which QPSK modulation is applied is performed as follows. In LDM modulation, the lower layer LL corresponds to the enhanced layer EL in the existing two-layer LDM modulation and is applied to a fixed UHDTV broadcast service. Therefore, in order to receive the lower layer LL, it is necessary to remove the UL and ML signals, which are upper layers, from the received three-layer LDM modulation signal.

The demodulation method of a general LDM system is configured such that, when QPSK modulation is applied to the upper layer UL and the middle layer ML, the UL signal is removed from the received three-layer LDM modulation signal by demodulating and remodulating the UL signal, and the ML signal is demodulated and remodulated so as to remove the ML signal component from the signal from which the UL signal is removed, as shown in FIG. 8. Here, because it is necessary to remove the UL signal and the ML signal sequentially, the signal-processing delay time required for restoration and remodulation of the UL and ML signals is increased, and the capacity of the storage device required for storing the received three-layer LDM modulation signal and the signal from which the UL signal is removed must also be increased. Furthermore, it is necessary to synchronize the remodulated UL signal and the received three-layer LDM modulation signal and to synchronize the remodulated ML signal and the signal acquired by removing the UL signal from the received three-layer LDM modulation signal, which causes problems of increasing hardware complexity and implementation difficulty.

The LDM system and the method of operating the same according to an embodiment of the present invention may perform three-layer LDM modulation by adding a new signal modulated with Amplitude-Shift Keying (ASK) between the core layer CL and the enhanced layer EL of the existing two-layer LDM modulation. Here, because the ASK-modulated third-layer signal is configured such that information is carried only in the amplitude thereof, restoration of the ASK-modulated signal does not require reception or remodulation of the upper-layer (UL) signal, which is required in order to remove the upper layer (UL) signal based on successive interference cancellation (SIC). Accordingly, the computational load is reduced, whereby the hardware complexity of a receiver and power consumption may be reduced and implementation difficulty may be decreased.

When ASK modulation, in which information is carried only in the amplitude of a signal, is applied to a newly added middle-layer signal, a QPSK-modulated CL signal may be simply removed using the fact that the amplitude of the QPSK-modulated signal of the highest layer CL is "1". Also, when the EL signal is demodulated, the QPSK-modulated CL signal and the ASK-modulated third-layer signal may be simultaneously demodulated from the received three-layer LDM modulation signal, whereby complexity in hardware implementation may be significantly reduced.

The three-layer LDM system and the method of operating the same according to an embodiment of the present invention may simplify implementation of a reception process because there is no need to demodulate or remodulate the upper-layer CL signal in order to receive the newly added middle-layer signal. Accordingly, it is advantageous from the aspects of reducing the complexity of a receiver and power consumption. Also, it is highly applicable to a mobile broadcast receiver, which is required to use a limited amount of power. Also, because it is possible to simultaneously restore the highest-layer UL signal and the second-highest-layer ML signal in the EL signal receiver for fixed UHDTV broadcasting reception, a signal-processing delay time may be significantly reduced. Also, hardware complexity and implementation difficulty may be significantly decreased.

The three-layer LDM modulation according to an embodiment of the present invention considers the provision of mobile HD broadcast service on the assumption that fixed reception of a 4K-UHDTV service is possible. Therefore, the lower layer LL for providing fixed UHDTV broadcasting uses high-order modulation in order to acquire a high transmission rate of about 20 Mbps, which is required for UHDTV broadcasting.

In three-layer LDM modulation according to an embodiment of the present invention, the effects of the upper layer UL and the middle layer ML on the reception of the lower layer LL for fixed UHDTV broadcasting are similar to the effect of the core layer CL on the enhanced layer EL in the existing two-layer LDM modulation. That is, the amplitudes of the signals of the upper layer UL and the middle layer ML may be set such that the effect of the signal acquired by adding the two signals on the lower layer LL is similar to the effect of the core layer on the enhanced layer in two-layer LDM modulation. For example, if the same transmission power is provided, because the distance between the constellation of the UL and that of the ML is large, low-order modulation, which is robust to noise, and error correction code of a low coding rate, which has excellent error correction performance, are applied. Particularly, in order to minimize the effect of the newly added ML signal on the reception of the LL signal of the lower layer and the reception of the UL signal of the upper layer, the ML signal is required to have a small amplitude. In this case, in order to improve the ML signal reception performance, it is necessary to maximize signal robustness. To this end, it is required to apply low-order modulation having a large distance between constellations and an error correction code of a low coding rate, which has excellent error correction performance. Therefore, the transmission rate is lower than that in the upper layer UL.

The target broadcast services, the reception characteristics, and the requirements of the upper layer UL, the middle layer ML, and the lower layer LL, in which the above-described properties of three-layer LDM modulation are considered, are as follows.

First, the upper layer UL aims at a mobile HDTV broadcast service. For example, the mobile HDTV broadcast service is provided for a TV having a screen size of about 50 inches in public transportation, such as buses, trains, and the like.

The characteristics of the reception of an UL signal and the requirements therefor are as follows. The UL signal is received in the state in which the signals of the middle layer ML and the lower layer LL are considered noise. Because the amplitude of the UL signal is sufficiently large, the UL signal may be received even though the ML and LL signals are considered noise.

Secondly, the middle layer ML aims at a mobile HDTV broadcast service. For example, the mobile HDTV broadcast service is provided for personal mobile terminals having a maximum screen size of 10 inches, such as smart pads, smartphones, and the like. When three-layer LDM modulation is implemented by adding a new signal in two-layer LDM modulation, the new layer must be added without affecting the performance of an enhanced layer EL, which is applied to fixed UHDTV broadcasting in the existing two-layer LDM modulation. Accordingly, the middle-layer signal for providing HDTV broadcasting to mobile terminals may be added in the state in which a certain level of degradation in the performance of the core layer CL is allowed. The middle-layer signal applies a signal having the smallest possible amplitude in order to minimize the effect thereof on the core layer CL.

The characteristics of the reception of the ML signal and the requirements therefor are as follows. The ML signal is received after the signal of the upper layer UL is removed from the received three-layer LDM modulation signal. The ML signal may be received when the UL signal, which is the upper layer, is removed from the received three-layer LDM modulation signal. The LL signal is considered noise.

Generally, when QAM-based modulation, in which information is carried both in the phase and in the amplitude of a signal, is applied to the middle layer ML, it is necessary to remove the UL signal from the received three-layer LDM modulation signal. Because this process requires restoration and remodulation of the UL signal, the complexity of a receiver and power consumption are significantly increased, which is disadvantageous for application thereof to reception of mobile broadcast service, which uses a power source having a limited amount of power. However, the three-layer LDM modulation method according to an embodiment of the present invention may solve the problems of increased hardware complexity and increased power consumption. That is, n-ASK is applied to the middle layer ML, whereby the fact that the amplitude of the QPSK signal of the upper layer UL is "1" may be used to remove the UL signal component from the received signal. Therefore, the three-layer LDM modulation method according to an embodiment of the present enables three-layer LDM modulation without demodulation or remodulation of the UL signal when the UL signal is removed from the received three-layer LDM modulation signal.

Thirdly, the lower layer LL aims at a fixed 4K-UHDTV broadcast service that is generally provided to many households.

The complexity of an LL signal receiver and power consumption by the receiver are as follows. When the LL signal is received, because it is necessary to remove all of the UL signal and the ML signal, which are upper layers, the computational load and the capacity of a signal storage device are increased, which results in a significant increase in the hardware complexity of the receiver and a significant increase in the amount of power consumed thereby. However, because fixed reception is not limited as to the amount of available power, power consumption is not a problem.

When the UL and ML signals, which are upper layers, are sequentially removed after simultaneous demodulation and remodulation of the UL and ML signals, the three-layer LDM modulation according to an embodiment of the present invention enables the ML signal to be removed immediately after the UL signal is removed from the received three-layer LDM modulation signal because it is possible to simultaneously restore and remodulate the UL signal and the ML signal. Accordingly, the capacity of a signal storage device and a signal-processing delay time are not increased. Also, when the modulated signal is received, the process of synchronizing signals may be greatly reduced, and implementation difficulty may not be increased.

If the UL and ML signals, which are upper layers, are sequentially removed after being sequentially demodulated and remodulated, it is required to remove the UL signal from the received three-layer LDM modulation signal by demodulating and remodulating the UL signal, to store the signal from which the UL signal is removed in the storage device, to demodulate and remodulate the ML signal, and to remove the ML signal from the signal from which the UL signal is removed. When the LL signal is restored through the above-described process, hardware complexity, the capacity of the signal storage device, and implementation difficulty are significantly increased.

However, because the three-layer LDM modulation according to an embodiment of the present invention modulates an ML signal based on n-ASK modulation, sequential demodulation/remodulation of UL and ML signals is not required when an LL signal is received.

The three-layer LDM modulation according to an embodiment of the present invention is configured to add a third-layer signal that is modulated with n-ASK between the core layer CL and the enhanced layer EL of the existing two-layer LDM modulation, thereby including an upper layer UL having the highest priority, a middle layer ML having the second-highest priority, and a lower layer LL having the lowest priority. In particular, the proposed three-layer LDM modulation applies n-ASK modulation, in which information is carried only in the amplitude of a signal, to the newly added ML signal, whereby the fact that the amplitude of the signal of the upper layer UL is constant may be used when the ML signal is received. To this end, the upper layer UL of the three-layer LDM modulation according to an embodiment of the present invention applies a Phase-Shift Keying (PSK)-based modulation method, through which a modulated signal has a fixed amplitude, such as QPSK.

Meanwhile, when n-ASK modulation is applied to a middle layer ML in the three-layer LDM modulation according to an embodiment of the present invention, the following advantages may be acquired.

The first advantage is that a UL signal may be simply removed in the process of receiving an ML signal. In order to receive the signal of the middle layer ML, it is necessary to remove the UL signal. In this case, because the upper layer UL uses PSK-based modulation such as QPSK, in which the amplitude of a signal is "1", the UL signal may be easily removed merely by subtracting the amplitude of the UL signal "1" from the received three-layer LDM modulation signal. This is because the ML signal carries information only in the amplitude thereof. Therefore, from the point of view of the ML signal, the UL signal component may be removed merely by removing the signal $1o$ corresponding to the amplitude of the UL signal.

As described above, because restoration of the n-ASK signal of the middle layer ML does not require restoration or remodulation of the UL signal, the storage capacity required for storing the result of the signal-processing operation and the received three-layer signal (e.g., storage 130 in FIG. 9) is barely increased.

When three-layer LDM modulation based on ASK, shown in FIG. 9, is compared with three-layer LDM modulation based on QPSK, shown in FIG. 8, the difference therebetween in terms of the signal-processing delay time and the capacity of the signal storage may be easily understood.

In the three-layer LDM modulation according to an embodiment of the present invention, the hardware complexity and power consumption required for reception of an ML signal are almost equal to those when a signal of a core layer CL is received in two-layer LDM modulation. That is, the hardware complexity of a receiver for receiving the ML signal and power consumption are barely increased. Accordingly, applicability to a mobile broadcast receiver, which uses a power source having a limited amount of power, may be improved.

Also, the method of restoring an LL signal in the three-layer LDM modulation according to an embodiment of the present invention may be performed as follows. In order to restore the LL signal, it is necessary to remove UL and ML signal components from the received three-layer LDM modulation signal. When an n-ASK-modulated ML signal is received, it is not necessary to restore or remodulate the UL signal. As shown in FIG. 9, in order to receive the LL signal, demodulation and remodulation of the n-ASK-modulated ML signal may be performed independently of and simultaneously with demodulation and remodulation of the QPSK-modulated UL signal.

The demodulation method of the LDM system according to an embodiment of the present invention may include receiving a Layer-Division Multiplexing (LDM) modulation signal, restoring a first-layer signal from the LDM modulation signal and remodulating the same, restoring and remodulating a second-layer signal by performing cancellation of the amplitude component of the first-layer signal from the LDM modulation signal using signaling information independently of restoration and remodulation of the first-layer signal, and restoring a third-layer signal using the first-layer signal, the second-layer signal, and the LDM modulation signal.

In an embodiment, restoring and remodulating the first-layer signal may be performed in parallel with restoring and remodulating the second-layer signal.

In an embodiment, the cancellation may be performed regardless of the result of restoration of the first-layer signal, and restoration and remodulation of the second-layer signal may correspond to Amplitude-Shift Keying (ASK).

In the case of three-layer LDM modulation based on QPSK shown in FIG. 8, it is necessary to first remove the UL signal from the received three-layer LDM modulation signal by restoring and remodulating the UL signal and to then remove the ML signal by restoring and remodulating the ML signal. However, the method of three-layer LDM modulation based on ASK according to an embodiment of the present invention may approximately halve the signal-processing delay time. That is, the signal-processing time may be decreased by the time that it takes to restore and remodulate the UL signal. Accordingly, the capacity of the LDM modulation signal storage 130, which stores a signal during the signal-processing delay time, may be significantly reduced.

The hardware complexity may be increased in proportion to the computational load required for restoration and remodulation of an ML signal when compared with the hardware complexity required for reception of the signal of an enhanced layer (EL) in two-layer LDM modulation. However, when an LL signal is restored in three-layer LDM modulation according to an embodiment of the present invention, hardware complexity, power consumption, and implementation difficulty may be maintained similar to those when an enhanced layer (EL) is received in the existing two-layer LDM modulation.

Figure 10:
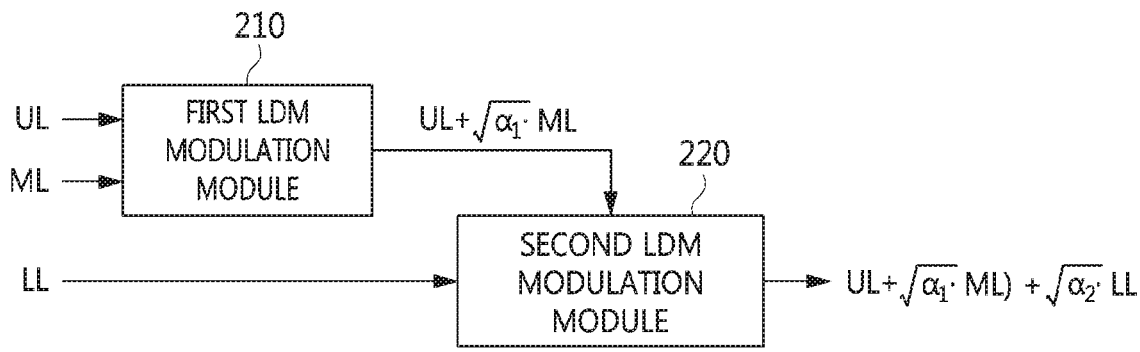
FIG. 10 is a view illustrating a three-layer LDM modulation module based on ASK modulation according to an embodiment of the present invention.

FIG. 10 is a view illustrating a three-layer LDM modulation module 200 based on ASK modulation according to an embodiment of the present invention.

Referring to FIG. 10, the three-layer LDM modulation module 200 may include a first LDM modulation module 210 and a second LDM modulation module 220.

The first LDM modulation module 210 performs two-layer LDM modulation by modulating a UL signal using a first modulation method (e.g., QPSK) and by modulating an ML signal using a second modulation method (e.g., ASK), whereby a two-layer LDM modulation signal (UL+$\sqrt{\alpha_1}$ML; a first LDM modulation signal) may be output. Here, UL denotes the modulated first-layer signal, ML denotes the modulated second-layer signal, and $\alpha_1$ denotes the first LDM modulation injection level.

The second LDM modulation module 220 performs two-layer LDM modulation for the signal (UL+$\sqrt{\alpha_1}$ML; the first LDM modulation signal) output from the first LDM modulation module 210 and a modulated third-layer signal LL, which is acquired by modulating an LL signal using a third modulation method (e.g., QAM), thereby outputting a three-layer LDM modulation signal ((UL+$\sqrt{\alpha_1}$ML)+$\sqrt{\alpha_2}$LL; a second LDM modulation signal). Here, $\alpha_2$ denotes a second LDM modulation injection level.

Meanwhile, the LDM modulation method shown in FIG. 10 uses two steps of a two-layer LDM modulation scheme. However, the LDM modulation scheme of the present invention is not limited thereto. The present invention may perform three-layer modulation through a single step.

The modulation method of the LDM system according to an embodiment of the present invention may include modulating a first-layer signal using a first modulation method, modulating a second-layer signal using a second modulation method, converting the modulated second-layer signal using a first injection level, modulating a third-layer signal using a third modulation method, converting the modulated third-layer signal using a second injection level, and generating a Layer-Division Multiplexing (LDM) modulation signal by combining the modulated first-layer signal, the converted second-layer signal, and the converted third-layer signal.

Figure 11:
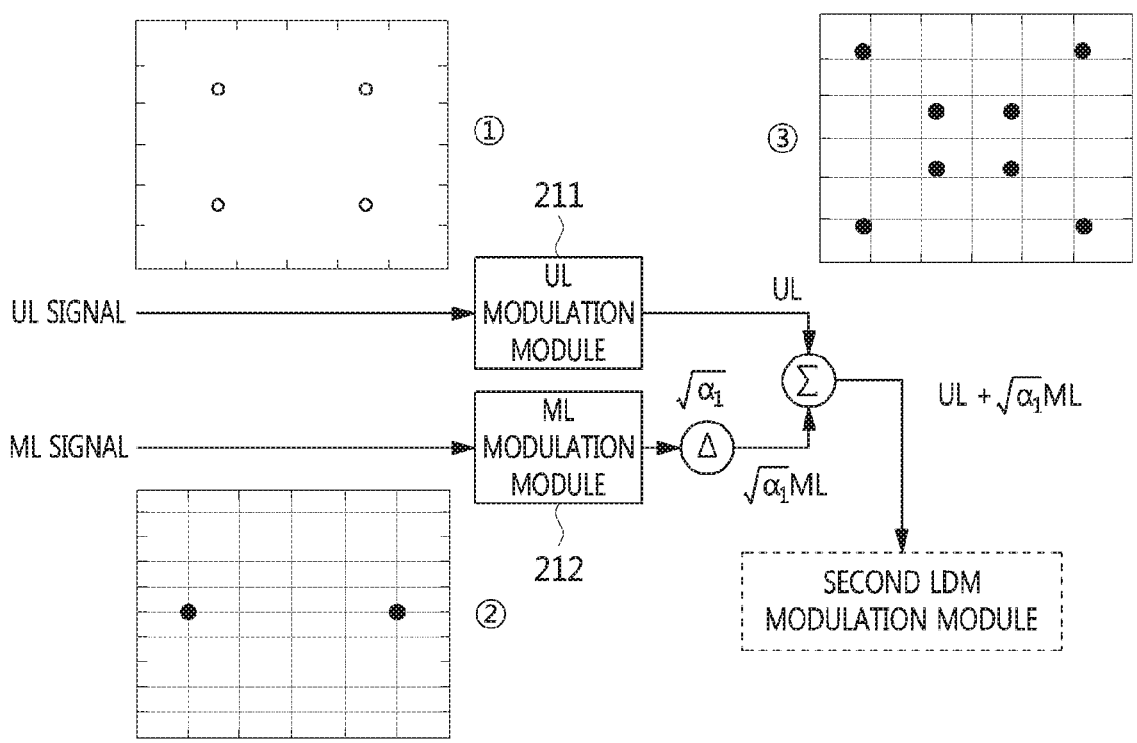
FIG. 11 is a view illustrating a modulation process in a first LDM modulation module in three-layer LDM modulation based on ASK and signal constellations at each step.

FIG. 11 is a view illustrating a modulation process in the first LDM modulation module 210 in three-layer LDM modulation based on ASK and signal constellations in each step. Referring to FIG. 11, the modulation process in the first LDM modulation module 210, in which QPSK modulation and 2-ASK modulation are applied to a UL signal and an ML signal, respectively, and signal constellations in each step are illustrated.

It is assumed that the power of each of a QPSK-modulated UL signal and a 2-ASK-modulated ML signal is 1. As shown in FIG. 11, when the QPSK-modulated UL signal ① is combined with the 2-ASK-modulated ML signal ② after the injection ① level $\alpha_1=\frac{1}{4}$ is applied such that the power of the 2-ASK-modulated ML signal is 6 dB lower than the power of the QPSK-modulated UL signal, the two-layer LDM modulation signal UL+$\sqrt{\alpha_1}$ML, which is represented as shown in ③, may be acquired. The constellations ③ of the two-layer LDM modulation signal are formed by superposing the constellations of the 2-ASK signal on the positions of the QPSK signal constellations in the four respective quadrants, whereby, based on each of the QPSK constellation points, two constellation points (the constellation, the signal amplitude of which is increased and the constellation, the signal amplitude of which is decreased) may be generated. The output signal (UL+$\sqrt{\alpha_1}$ML) of the first LDM modulation may be input to the second LDM modulation module 220.

Figure 12:
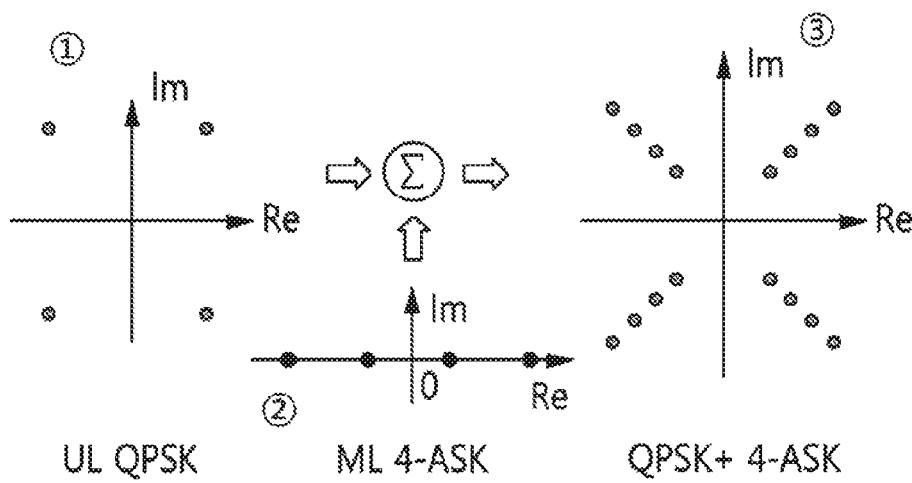
FIG. 12 is a view illustrating constellations of UL, ML, and LDM modulation signals at a first step when 4-ASK is applied to the ML according to an embodiment of the present invention.

FIG. 12 is a view illustrating constellations of UL, ML, and LDM modulation signals at a first step when 4-ASK is applied to the ML signal according to an embodiment of the present invention.

If 4-ASK modulation is applied to an ML signal, the ML signal has a total of four constellations such that two constellations are present on each side based on the origin point, as shown in ②. Accordingly, when the 4-ASK-modulated ML signal ② and the QPSK-modulated UL signal ① are added, constellations having a shape in which the 4-ASK-modulated ML signal having four different amplitudes are added based on the constellation points of the QPSK-modulated UL signal may be acquired, as shown in ③.

Figure 13:
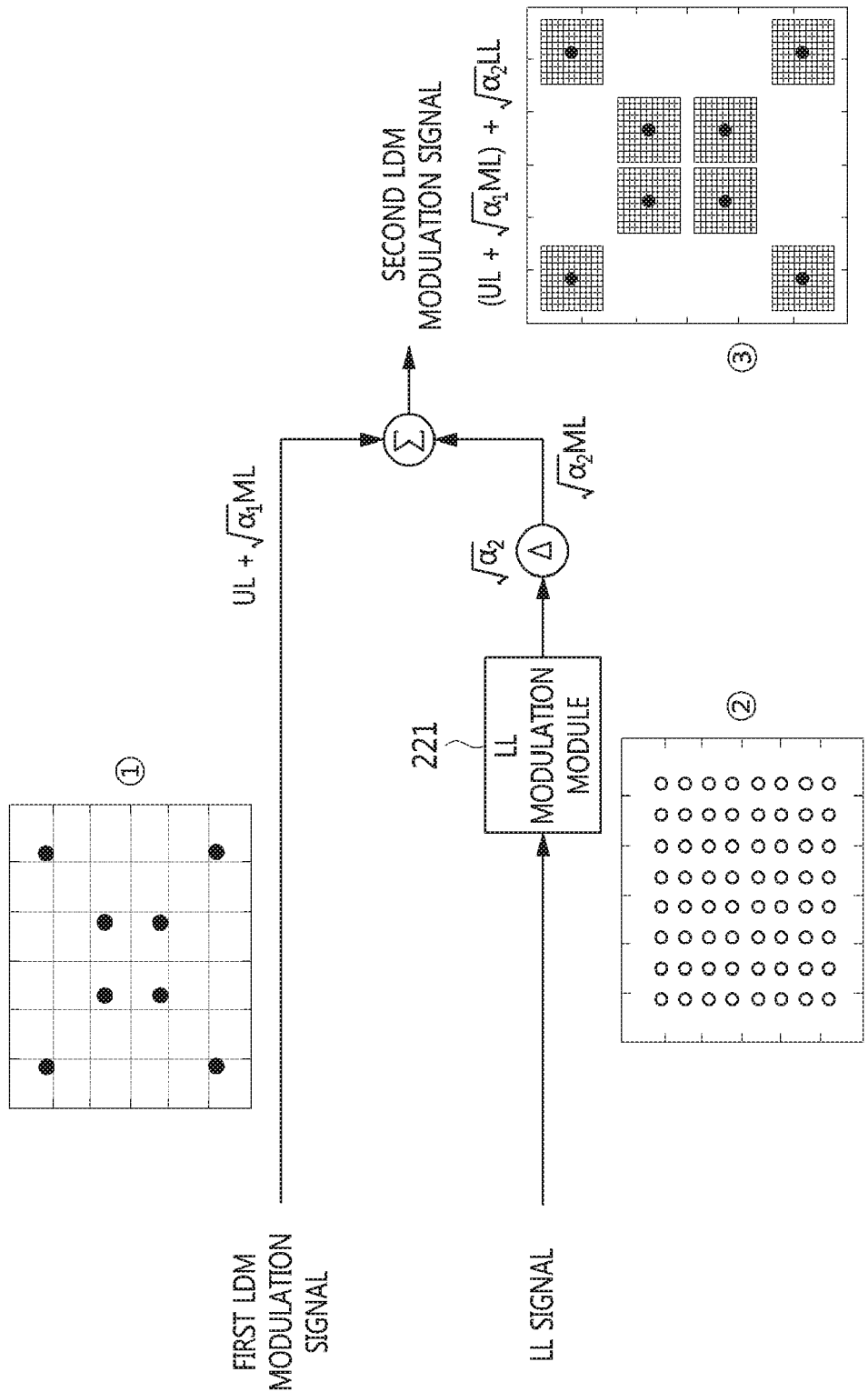
FIG. 13 is a view illustrating a second LDM modulation process according to an embodiment of the present invention.

FIG. 13 is a view illustrating a second LDM modulation process according to an embodiment of the present invention. Referring to FIG. 13, the signal UL+$\sqrt{\alpha_1}$ML acquired in the first LDM modulation process is combined with a 64-QAM LL signal to which the injection level $\alpha_2$ is applied, whereby three-layer modulation may be performed. The LL signal shown in FIG. 13 applies 64-QAM having a high modulation order in order to provide fixed UHD broadcasting. The first LDM modulation signal UL+$\sqrt{\alpha_1}$ML and the signal a $\sqrt{\alpha_2}$LL to which the second injection level $\alpha_2$ is applied are combined, whereby the three-layer LDM modulation signal (UL+$\sqrt{\alpha_1}$ML)+$\sqrt{\alpha_2}$LL may be acquired.

The constellations of the three-layer modulation signal may be acquired by combining constellations ① of the first LDM modulation signal with constellations ② of the 64-QAM LL signal to which the second insertion level $\alpha_2$ is applied.

FIG. 13 shows that, after the second injection level $\alpha_2$=12 dB is applied, the constellations of the 64-QAM LL signal, the power of which is decreased to $1/\sqrt{16}$ of that of the first LDM modulation signal, is present in each of the constellation points of the first LDM modulation signal.

Figure 14:
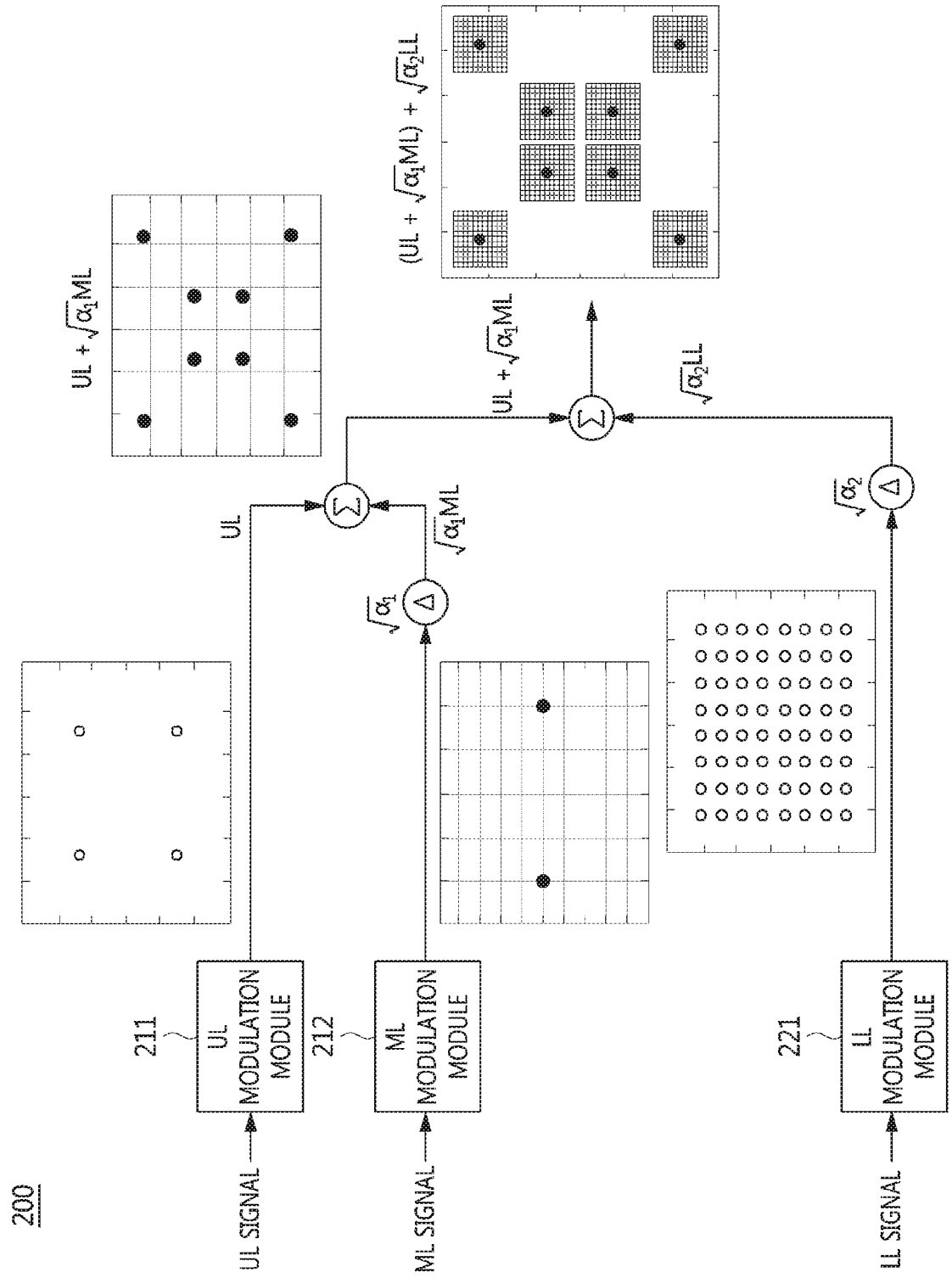
FIG. 14 is a view illustrating signal constellations at each signal step in a three-layer LDM modulation apparatus based on ASK according to an embodiment of the present invention.

FIG. 14 is a view illustrating signal constellations at each signal step in a three-layer LDM modulation apparatus 200 based on ASK according to an embodiment of the present invention. Referring to FIG. 14, the modulated UL signal generated by the UL modulation module 211 is a QPSK-modulated UL signal, the modulated ML signal generated by the ML modulation module 212 is a 2-ASK-modulated ML signal, and the modulated LL signal generated by the LL modulation module 221 is a 64-QAM LL signal.

The constellations of the first LDM modulation signal UL+$\sqrt{\alpha_1}$ML may be determined by combining the QPSK-modulated UL signal and the 2-ASK-modulated ML signal. The constellations of the second LDM modulation signal (UL+$\sqrt{\alpha_1}$ML)+$\sqrt{\alpha_2}$LL may be determined by combining the first LDM modulation signal UL+$\sqrt{\alpha_1}$ML and the 64-QAM LL signal.

Figure 15:
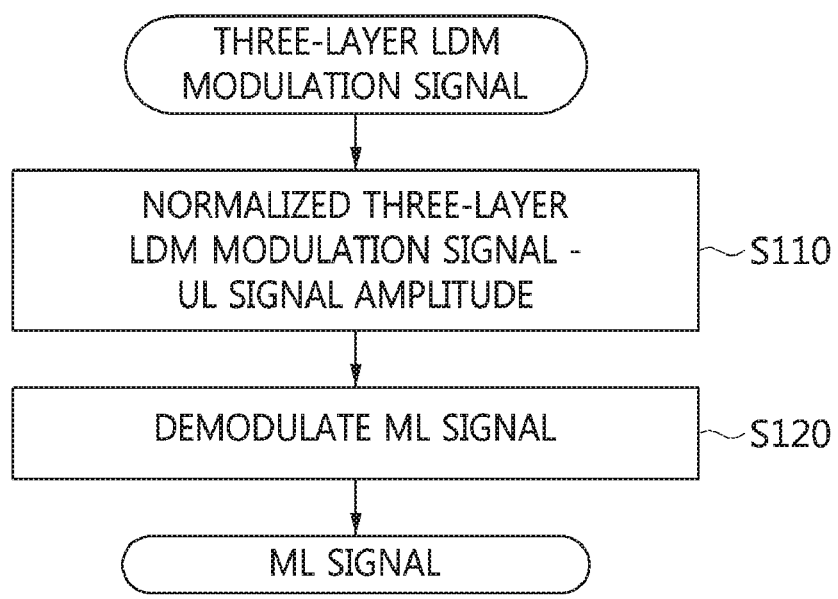
FIG. 15 is a view illustrating a demodulation process in a three-layer LDM system based on ASK modulation according to an embodiment of the present invention.

FIG. 15 is a view illustrating a demodulation process in a three-layer LDM system based on ASK modulation according to an embodiment of the present invention.

Referring to FIG. 15, the demodulation process of the three-layer LDM system based on ASK may be configured by performing the modulation process in reverse order.

The overall process of receiving an LL signal is as shown in FIG. 9. The received three-layer LDM modulation signal, $X_{rx}(n)$, may be represented using the following Equation (1):

$$X_{tx}(n) = hX_{tx}(n) \qquad (1)$$
$$= h[(UL_{tx} + \sqrt{\alpha_1} ML_{tx}) + \sqrt{\alpha_2} LL_{tx}]$$
$$= h(UL_{tx} + \sqrt{\alpha_1} ML_{tx}) + h\sqrt{\alpha_2} LL_{tx}$$

Here, $X_{tx}$ denotes a transmitted three-layer LDM modulation signal, h denotes a channel transmission function, and $UL_{tx}$, $ML_{tx}$, and $LL_{tx}$, denote the UL (the modulated first-layer signal), ML (the modulated second-layer signal), and LL (the modulated third-layer signal) of a transmitter.

Meanwhile, the process of receiving each layer of the three-layer LDM modulation signal according to an embodiment of the present invention is performed as follows.

First, the process of demodulating a UL signal is performed as follows. In spite of the presence of ML and LL signals, the UL signal may be immediately received by treating the ML and LL signals as noise. That is, when a signal in which the ML signal, the LL signal, Additive White Gaussian Noise (AWGN), and a residual channel distortion compensation error are combined is regarded as noise, the UL signal may be received normally because low-order modulation and error correction code, which are robust to noise, are applied thereto.

Next, the process of demodulating the ML signal is performed as follows.

FIG. 15 is a view illustrating the process of receiving the ML signal in a three-layer LDM system according to an embodiment of the present invention.

Referring to FIG. 15, the ML signal may be received by removing the UL signal from the received three-layer LDM modulation signal. Here, because n-ASK modulation, which carries information only in the amplitude of a signal, is applied to the ML signal, the UL signal component may be removed from the received three-layer LDM modulation signal at step S110 merely by subtracting the amplitude ($1/\sqrt{1+\alpha_1+\alpha_2}$) of the UL signal, from the point of view of the ML signal. Accordingly, removal of the UL signal does not require restoration or remodulation of the UL signal. Then, demodulation of the ML signal may be performed at step S120. For example, the signal generated at step S110 is multiplied by $1/\sqrt{\alpha_1}$, whereby the ML signal may be acquired.

The signaling information, which is first restored in the receiver, includes information about the injection levels $\alpha_1$ and $\alpha_2$. Therefore, using the restored injection levels $\alpha_1$ and $\alpha_2$, the amplitude of the UL signal component in the received three-layer LDM modulation signal may be calculated. When the calculated amplitude of the UL signal component is subtracted from the amplitude of the received three-layer LDM modulation signal, the UL signal component may be removed from the received three-layer LDM modulation signal from the point of view of the ML signal.

When the power of the UL, ML, and LL, which form the received three-layer LDM modulation signal, is normalized to be $P_{UL}=P_{ML}=P_{LL}=1$, the UL, ML, and LL signals are added at a ratio of $1:\alpha_1:\alpha_2$. Also, when the amplitude of the received three-layer LDM modulation signal is normalized to "1", the power of the received three-layer LDM modulation signal may be represented as shown in the following equation:

$$P_{X_{rs}} = K \cdot (P_{UL} + \alpha_1 P_{ML} + \alpha_2 P_{LL}) = 1 \qquad (2)$$

Here, K is defined as $$K = \frac{1}{1+\alpha_1+\alpha_2},$$

$P_{UL}$ denotes the power of the UL signal, $P_{ML}$ denotes the power of the ML signal, and $P_{LL}$ denotes the power of the LL signal. Therefore, the amplitude of the UL signal included in the received three-layer LDM modulation signal becomes $1/\sqrt{1+\alpha_1+\alpha_2}$.

Figure 16:
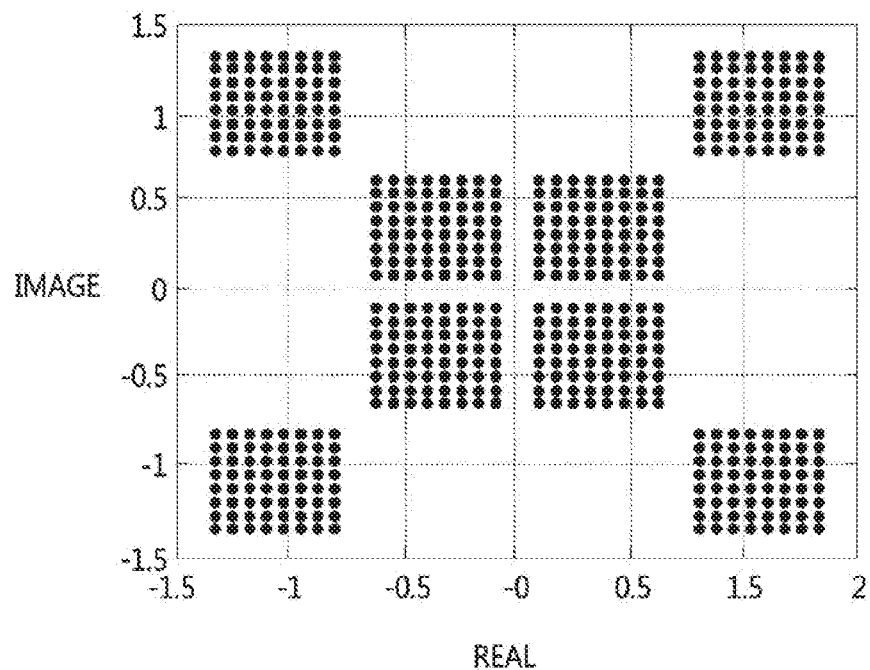
FIG. 16 is a view illustrating a received three-layer LDM modulation signal according to an embodiment of the present invention.

FIG. 16 is a view illustrating a received three-layer LDM modulation signal according to an embodiment of the present invention.

Figure 17:
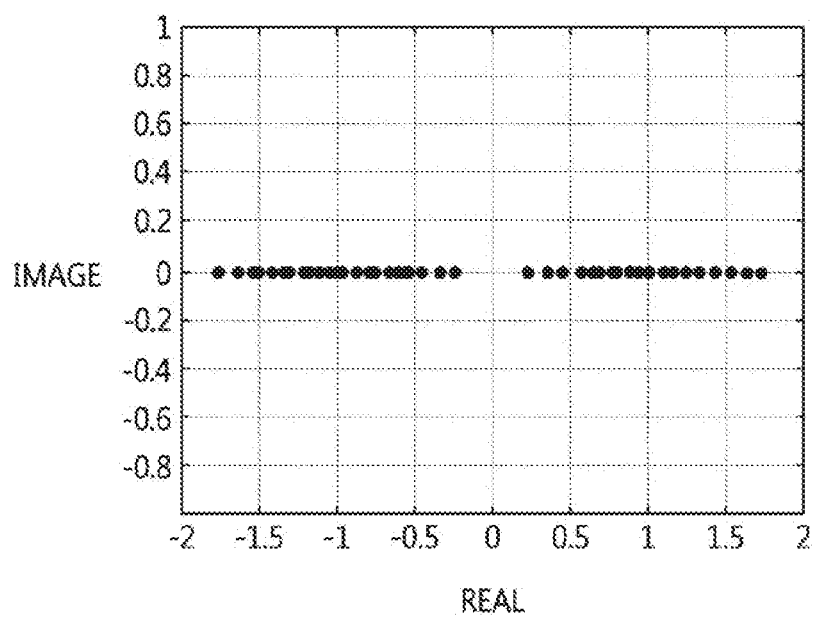
FIG. 17 is a view illustrating constellations when a UL signal is removed from the received three-layer LDM modulation signal illustrated in FIG. 16.

FIG. 17 is a view illustrating constellations when a UL signal is removed from the received three-layer LDM modulation signal illustrated in FIG. 16.

Referring to FIG. 16 and FIG. 17, assuming an ideal case in which UL, ML, and LL signals are modulated using QPSK, 2-ASK, and 64-QAM, respectively, in which injection levels are set to $\alpha_1$=3 dB and $\alpha_2$=6 dB, and in which an SNR is set to 100 dB (SNR=100 dB), the received three-layer LDM modulation signal may be represented as constellations in which the QPSK-modulated UL signal, the 2-ASK-modulated ML signal, and the LL signal modulated with 64QAM are combined, as shown in FIG. 16.

The 2-ASK-modulated ML signal may be received using the fact that information is carried only in the amplitude of the signal. In terms of restoration of the ML signal, only the amplitude of the received three-layer LDM modulation signal is meaningful. Therefore, when only the amplitude of the UL signal is removed from the received three-layer LDM modulation signal, the UL signal may be removed from the point of view of the ML signal. The signal acquired by subtracting the abstract value of the amplitude of the UL signal from the received three-layer LDM modulation signal may be represented as shown in FIG. 17. The constellation of the 2-ASK-modulated ML signal, illustrated in FIG. 17, has a shape in which not a single point but multiple points are distributed on a real-number axis based on the origin point due to the effect of the LL signal modulated with 64-QAM. Here, the remaining LL signal modulated with 64-QAM is considered noise, and the 2-ASK-modulated ML signal may be restored in consideration of the characteristics of 2-ASK modulation, which has positive and negative amplitudes based on the origin point.

Meanwhile, the process of demodulating the LL signal may be performed as follows. The overall process of receiving the LL signal may be performed by restoring the upper-layer UL signal and the middle-layer ML signal from the LDM modulation signal, remodulating the same, removing the two signals, and restoring the LL signal, as shown in FIG. 9. The three-layer LDM modulation signal $X_n$, which is received in such a way that the transmission signal $X_{tx}$ from the transmitter passes through the transmission channel h, is represented as shown in the following equation:

$$X_{rx}(n) = hX_{tx} \qquad (3)$$
$$= h[(UL_{tx} + \sqrt{\alpha_1}\, ML_{tx}) + \sqrt{\alpha_2}\, LL_{tx}]$$
$$= h(UL_{tx} + \sqrt{\alpha_1}\, ML_{tx}) + h\sqrt{\alpha_2}\, LL_{tx}$$

When the above equation is solved for the LL signal, the equation may be represented as follows:

$$h\sqrt{\alpha_2}LL_{tx} = X_{rx}(n) - h(UL_{tx}+\sqrt{\alpha_1}ML_{tx})$$

$$LL_{tx} = \{X_{rx}(n) - h(UL_{tx}+\sqrt{\alpha_1}ML_{tx})\}/(h\sqrt{\alpha_2}) \qquad (4)$$

Accordingly, in order to receive the LL signal, it is necessary to remove the first LDM modulation signal from the received three-layer LDM modulation signal. After the UL and ML signals are restored and remodulated in the receiver, the first LDM modulation signal $UL_{RE}+\sqrt{\alpha_1}ML_{RE}$ may be generated using the remodulated signals $UL_{RE}$ and $ML_{RE}$. Then, the received LL signal $LL_{rx}$ may be acquired through the following equation:

$$LL_{rx} = \{X_{rx}(n) - h(UL_{RE}+\sqrt{\alpha_1}ML_{RE})\}/(h\sqrt{\alpha_2}) \qquad (5)$$

Here, the transmission function h of the channel uses a channel estimation vector, which is acquired through channel estimation.

A wireless transmission system to which LDM modulation according to an embodiment of the present invention is applied may perform three-layer LDM modulation by adding a new signal modulated with Amplitude-Shift Keying (ASK) between the core layer CL and the enhanced layer EL of the existing two-layer LDM modulation. Because the middle-layer signal modulated with ASK carries information only in the amplitude of the signal, the process of restoring the ASK-modulated signal does not require the process of receiving or remodulating the upper-layer signal, which is necessary in order to remove the upper-layer signal based on successive interference cancellation (SIC). Accordingly, the computational load may be reduced, whereby the hardware complexity of the receiver, the amount of power consumed thereby, and the level of difficulty of implementation thereof may be decreased.

With regard to two-layer LDM modulation defined in a general ATSC 3.0 broadcast system, when QPSK and 64-QAM are applied to a core layer CL and an enhanced layer EL, respectively, the CL signal may be directly demodulated from the received two-layer LDM modulated signal, but the EL signal may be received when the CL signal is removed. Therefore, in order to receive the EL signal, it is necessary to remove the CL signal component from the received two-layer LDM modulation signal by demodulating and remodulating the CL signal of the upper layer.

Meanwhile, when three-layer LDM modulation is attempted by adding a new signal in the two-layer LDM modulation, if QAM-based modulation, which carries information in both the amplitude and phase of the signal, is applied, it is necessary to remove the upper-layer CL signal in order to receive the middle-layer signal. Because this process requires demodulation and remodulation of the CL signal, the complexity of the receiver and the amount of power consumed thereby are increased. Therefore, application of QAM-based modulation to the new middle-layer signal results in an increase in the complexity of the receiver and an increase in the amount of power consumed by the receiver. Accordingly, it is disadvantageous for application to mobile broadcasting, which uses a limited amount of power.

However, when ASK modulation, in which information is carried only in the amplitude of a signal, is applied to the newly added middle-layer signal, as in the present invention, the QPSK-modulated CL signal may be easily removed using the fact that the amplitude of the highest-layer QPSK-modulated CL signal is "1". Also, when the EL signal is demodulated, the QPSK-modulated CL signal and the ASK-modulated middle-layer signal may be simultaneously demodulated from the received three-layer LDM modulated signal, whereby the complexity of hardware implementation may be significantly reduced.

Because there is no need to demodulate and remodulate the upper-layer CL signal in order to receive the newly added middle-layer signal, the reception process is very simple. Therefore, the present invention is advantageous from the aspect of reducing the complexity of a receiver and power consumption, and may be highly applicable to a mobile broadcast receiver, which is required to use a limited amount of power. Also, because it is possible to simultaneously restore the highest-layer signal and the second-highest-layer signal in the EL signal receiver for fixed reception of UHDTV broadcasting, a signal-processing delay time may be significantly reduced, and hardware complexity and implementation difficulty may be greatly decreased.

Figure 18:
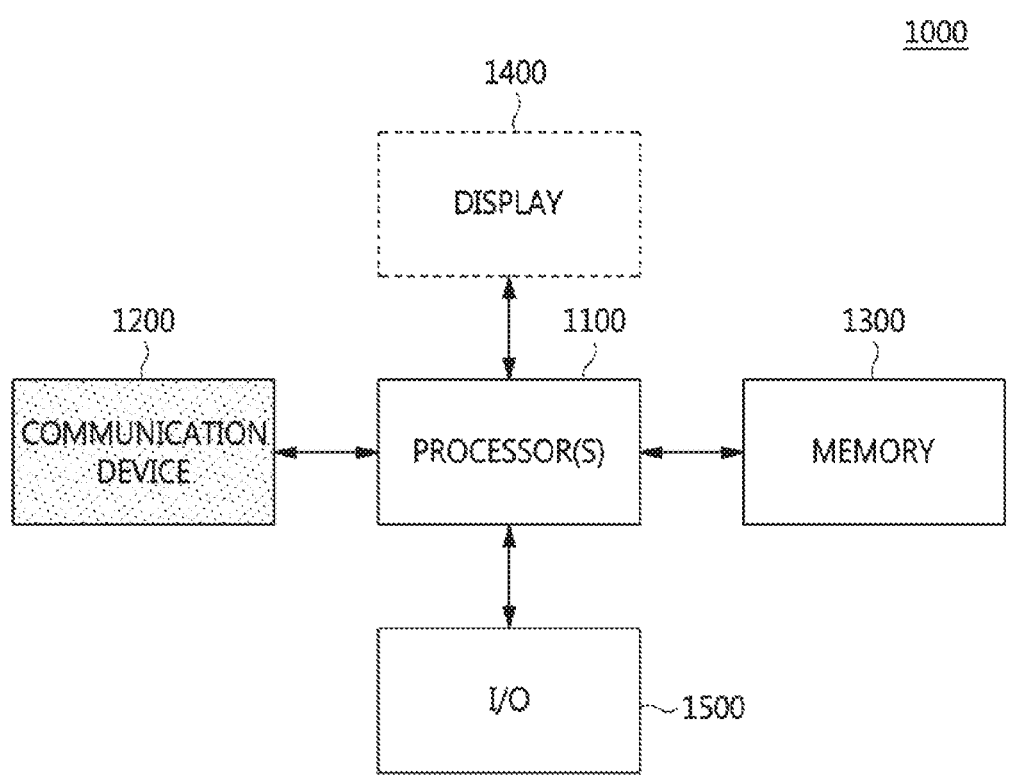
FIG. 18 is a view illustrating an electronic device according to an embodiment of the present invention.

FIG. 18 is a view illustrating an electronic device 1000 according to an embodiment of the present invention. Referring to FIG. 18, the electronic device 1000 may include at least one processor 1100, a network interface 1200, memory 1300, a display 1400, and an I/O device 1500.

The processor 1100 may include at least one of the devices described with reference to FIGS. 1 to 17, or may be implemented using at least one of the methods described with reference to FIGS. 1 to 17. The processor 1100 may execute instructions so as to receive an LDM modulation signal, to restore a first-layer signal from the LDM modulation signal and remodulate the same, to restore a second-layer signal from the LDM modulation signal and remodulate the same, and to restore a third-layer signal using the first-layer signal, the second-layer signal, and the LDM modulation signal, as described above.

The processor 1100 may run programs and control the electronic device 1000. The electronic device 1000 may be connected with an external device (e.g., a personal computer or a network) and may exchange data therewith via the I/devices 1500. The electronic device 1000 may include various electronic systems, including mobile devices such as a mobile phone, a smartphone, a PDA, a tablet PC, a laptop computer, and the like, computing devices such as a PC, a tablet PC, a netbook, and the like, and electronic products such as a TV, a smart TV, a security device for gate control, and the like.

The network interface 1200 may be implemented so as to communicate with an external network using any of various wired/wireless methods.

The memory 1300 may store computer-readable instructions. The processor 1100 may perform the above-described operations by executing the instructions stored in the memory 1300. The memory 1300 may be volatile or nonvolatile memory. The memory 1300 may include a storage device for storing user data. The storage device may be an embedded multimedia card (eMMC), a solid-state drive (SSD), universal flash storage (UFS), or the like. The storage device may include at least one nonvolatile memory device. The nonvolatile memory device may be any of NAND flash memory, Vertical NAND (VNAND), NOR flash memory, Resistive Random-Access Memory (RRAM), Phase-Change Memory (PRAM), Magnetoresistive Random-Access Memory (MRAM), Ferroelectric Random-Access Memory (FRAM), Spin-Transfer-Torque Random-Access Memory (STT-RAM), and the like.

The embodiments described above may be implemented through hardware components, software components, and/or combinations thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, or any other device capable of executing instructions and responding thereto. The processing device may run an operating system (OS) and one or more software applications executed on the OS.

Also, the processing device may access, store, manipulate, process and create data in response to execution of the software. For the convenience of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The method according to the embodiments may be implemented as program instructions executable by various computer devices, and may be recorded in computer-readable storage media. The computer-readable storage media may individually or collectively include program instructions, data files, data structures, and the like. The program instructions recorded in the media may be specially designed and configured for the embodiment, or may be readily available and well known to computer software experts. Examples of the computer-readable storage media include magnetic media such as a hard disk, a floppy disk and a magnetic tape, optical media such as a CD-ROM and a DVD, and magneto-optical media such as a floptical disk, ROM. RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured so as to operate as one or more software modules in order to perform the operations of the embodiment and vice-versa.

The present invention may perform three-layer LDM modulation by adding an n-ASK-modulated signal, which carries information only in the amplitude thereof, as a middle layer between an upper-layer signal and a lower-layer signal in the existing two-layer LDM modulation.

In an embodiment, as the first step, the transmitter of a three-layer LDM system may generate a two-layer LDM modulation signal $UL+\sqrt{\alpha_1}ML$ by combining an upper-layer UL signal with a middle-layer ML signal to which an injection level $\alpha_1$ is applied.

In an embodiment, as the second step, the transmitter of the three-layer LDM system may generate a final three-layer LDM modulation signal $(UL+\sqrt{\alpha_1}ML)+\sqrt{\alpha_2}LL$ by combining the two-layer LDM modulation signal $UL+\sqrt{\alpha_1}ML$ with a lower-layer LL signal to which an injection level $\alpha_2$ is applied.

In an embodiment, when it receives the n-ASK-modulated middle-layer signal, the receiver of the three-layer LDM system removes the UL signal by subtracting the amplitude component of the UL signal from the three-layer LDM modulation signal, thereby receiving the ML signal.

In an embodiment, when it receives the lower-layer signal of the three-layer LDM modulation signal, the receiver of the three-layer LDM system restores the UL signal and generates a remodulated signal $UL_{RE}$ by directly acquiring the UL signal from the received three-layer LDM modulation signal. Simultaneously, the receiver of the three-layer LDM system removes the UL signal from the received signal by subtracting the amplitude component thereof, restores the ML signal by receiving the same, and generates a remodulated signal $ML_{RE}$. Then, the receiver of the three-layer LDM system synchronizes the starts of the respective signals and removes $UL_{RE}$ and $ML_{RE}$ from the received three-layer LDM modulation signal, thereby restoring the LL signal.

In an embodiment, the restoration and remodulation of the UL signal and the restoration and remodulation of the ML signal are simultaneously performed in parallel, whereby the signal-processing delay time and the capacity of a signal storage device may be reduced.

The present invention may perform three-layer LDM modulation by adding a new signal modulated with Amplitude-Shift Keying (ASK) between the core layer CL and the enhanced layer EL of the existing two-layer LDM modulation in a wireless transmission system to which LDM modulation is applied. Because the third-layer signal modulated with ASK carries information only in the amplitude thereof, the process of receiving and remodulating the upper-layer signal for removing the upper-layer signal based on successive interference cancellation (SIC) is not required when the ASK-modulated signal is restored. Accordingly, a computational load is reduced, and the hardware complexity of the receiver, power consumption, and implementation difficulty may be decreased.

The modulation and demodulation methods of an LDM system according to an embodiment of the present invention enable a QPSK-modulated signal of an upper layer CL to be easily removed when a newly added ASK-modulated signal is received in three-layer LDM modulation. Accordingly, the present invention has advantages in which there is little difference from existing two-layer LDM modulation in terms of the complexity of a receiver and the amount of power consumed by the receiver.

The modulation and demodulation methods of an LDM system according to an embodiment of the present invention may enable a newly added middle-layer (ML) signal to be immediately received without demodulation or remodulation of a QPSK-modulated signal of an upper layer CL.

The modulation and demodulation methods of an LDM system according to an embodiment of the present invention do not incur an increase in the complexity of a receiver or an increase in the amount of power consumed by the receiver.

The modulation and demodulation methods of an LDM system according to an embodiment of the present invention are applicable to mobile broadcasting, which is required to use a limited amount of power.

When an EL signal, which is applied to fixed UHDTV broadcasting, is received, it is necessary to remove CL and ML signals, which are signals of upper layers, in which case the modulation and demodulation methods of an LDM system according to an embodiment of the present invention enable demodulation and remodulation of the QPSK-modulated CL signal to be performed simultaneously with demodulation and remodulation of the ASK-modulated ML signal. Accordingly, hardware complexity and implementation difficulty may be reduced so as to be similar to those in two-layer LDM modulation.

Meanwhile, the above description is merely of specific embodiments for practicing the present invention. The present invention encompasses not only concrete and available means but also the technical spirit corresponding to abstract and conceptual ideas that may be used as future technology.

What is claimed is:

1. A demodulation method of a Layer-Division Multiplexing (LDM) system, comprising:
   receiving an LDM modulation signal,
   restoring a first-layer signal from the LDM modulation signal and remodulating the first-layer signal;
   restoring and remodulating a second-layer signal by performing cancellation of an amplitude component of the first-layer signal from the LDM modulation signal using signaling information, independently of restoration and remodulation of the first-layer signal; and
   restoring a third-layer signal using the first-layer signal, the second-layer signal, and the LDM modulation signal.

2. The demodulation method of claim 1, wherein restoring and remodulating the first-layer signal is performed in parallel with restoring and remodulating the second-layer signal.

3. The demodulation method of claim 1, wherein the cancellation is performed regardless of a result of restoration of the first-layer signal, and restoration and remodulation of the second-layer signal corresponds to Amplitude-Shift Keying (ASK).

4. The demodulation method of claim 3, wherein the signaling information includes a first injection level that is used when the second-layer signal is modulated and a second injection level that is used when the third-layer signal is modulated.

5. The demodulation method of claim 4, wherein remodulating the second-layer signal comprises restoring the second-layer signal from a modulated second-layer signal corresponding to a result of the cancellation using the second injection level.

6. The demodulation method of claim 1, further comprising:
   storing the received LDM modulation signal.

7. The demodulation method of claim 6, wherein:
   restoring the third-layer signal comprises removing a first LDM modulation signal from the LDM modulation signal,
   the first LDM modulation signal is a signal acquired by combining a modulated first-layer signal and a modulated second-layer signal, a power level of which is changed based on a first injection level, and
   the modulated first-layer signal is a signal acquired by modulating the first-layer signal using a first modulation method.

8. The demodulation method of claim 7, wherein:
restoring the third-layer signal comprises restoring the third-layer signal from a signal from which the first LDM modulation signal is removed using a second injection level, and
the LDM modulation signal is a signal acquired by combining the first LDM modulation signal with a modulated third-layer signal, a power level of which is changed based on the second injection level.

9. A receiver of a Layer-Division Multiplexing (LDM) system, comprising:
a first-layer signal restoration and remodulation module for restoring a first-layer signal from an LDM modulation signal and remodulating the first-layer signal;
a second-layer signal restoration and remodulation module for restoring and remodulating a second-layer signal by performing cancellation of an amplitude component of the first-layer signal from the LDM modulation signal using signaling information independently of restoration and remodulation of the first-layer signal;
a third-layer restoration module for restoring a third-layer signal using the first-layer signal, the second-layer signal, and the LDM modulation signal; and
LDM signal storage for storing the LDM modulation signal,
wherein the first-layer signal restoration and remodulation module is operated in parallel with the second-layer signal restoration and remodulation module.

10. The receiver of claim 9, wherein, in the LDM modulation signal, power of each of a modulated first-layer signal, a modulated second-layer signal, and a modulated third-layer signal is normalized to 1.

11. The receiver of claim 10, wherein the second-layer signal restoration and remodulation module performs cancellation of the amplitude component of the first-layer signal from the normalized LDM modulation signal.

12. The receiver of claim 11, wherein:
an amplitude of the first-layer signal is determined depending on a first injection level and a second injection level,
the first injection level is a value that is used in order to change a power level of the modulated second-layer signal when the LDM modulation signal is generated, and
the second injection level is a value that is used in order to change a power level of the modulated third-layer signal when the LDM modulation signal is generated.

13. The receiver of claim 9, wherein the third-layer restoration module synchronizes starts of the LDM modulation signal, the first-layer signal, and the second-layer signal.

14. The receiver of claim 9, wherein:
the first-layer signal restoration and remodulation module outputs the first-layer signal by demodulating a Quadrature Phase-Shift Keying (QPSK)-modulated signal;
the second-layer signal restoration and remodulation module outputs the second-layer signal by demodulating an Amplitude-Shift Keying (ASK)-modulated signal; and
the third-layer restoration module outputs the third-layer signal by demodulating a Quadrature Amplitude Modulation (QAM)-modulated signal.

15. A modulation method of a Layer-Division Multiplexing (LDM) system, comprising:
modulating a first-layer signal using a first modulation method,
modulating a second-layer signal using a second modulation method;
converting the modulated second-layer signal using a first injection level;
modulating a third-layer signal using a third modulation method;
converting the modulated third-layer signal using a second injection level; and
generating an LDM modulation signal by combining the modulated first-layer signal, the converted modulated second-layer signal, and the converted modulated third-layer signal,
wherein the first injection level and the second injection level are transmitted to a receiver as signaling information.

16. The modulation method of claim 15, wherein:
the first modulation method is a Quadrature Phase-Shift Keying (QPSK) modulation method,
the second modulation method is an Amplitude-Shift Keying (ASK) modulation method, and
the third modulation method is a Quadrature Amplitude Modulation (QAM) method.

17. The modulation method of claim 15, wherein the LDM modulation signal is generated using a two-layer multiplexing method.

18. The modulation method of claim 17, wherein generating the LDM modulation signal comprises:
generating a first LDM modulation signal by combining the modulated first-layer signal with the converted modulated second-layer signal; and
generating a second LDM modulation signal by combining the first LDM modulation signal with the converted modulated third-layer signal.

* * * * *